United States Patent
Beck

(10) Patent No.: US 8,683,795 B1
(45) Date of Patent: Apr. 1, 2014

(54) CONTROL VALVE FOR A HYDRAULIC REFUELING BOOM SYSTEM

(75) Inventor: Carl William Beck, Haysville, KS (US)

(73) Assignee: The Boeing Company, Chicago, IL (US)

( * ) Notice: Subject to any disclaimer, the term of this patent is extended or adjusted under 35 U.S.C. 154(b) by 920 days.

(21) Appl. No.: 12/773,158

(22) Filed: May 4, 2010

(51) Int. Cl.
*F16D 31/02* (2006.01)

(52) U.S. Cl.
USPC .................................. 60/468; 91/445; 91/446

(58) Field of Classification Search
USPC ................... 91/420, 445, 446, 461, 419, 433; 60/468; 244/135 A, 135 R
See application file for complete search history.

(56) References Cited

U.S. PATENT DOCUMENTS

| | | | | |
|---|---|---|---|---|
| 4,072,283 A | * | 2/1978 | Weiland | 244/135 A |
| 5,076,143 A | * | 12/1991 | Ogawa | 91/420 |
| 5,183,071 A | * | 2/1993 | Ogawa | 137/106 |
| 6,152,169 A | | 11/2000 | Flick | |
| 7,204,266 B2 | | 4/2007 | Krenzer et al. | |
| 7,263,924 B2 | * | 9/2007 | Ioku | 91/447 |

* cited by examiner

*Primary Examiner* — Edward Look
*Assistant Examiner* — Logan Kraft
(74) *Attorney, Agent, or Firm* — Yee & Associates, P.C.

(57) ABSTRACT

A method for controlling fluid flow. A valve system may be kept in an open state in response to a fluid being at a selected level of pressure at any of a plurality of ports in a valve. The valve system may be for the valve, and the valve may comprise a housing, the plurality of ports on the housing, and the valve system located inside the housing. The valve system may be configured to be in a closed state when an absence of the selected level of pressure is present at all of the plurality of ports and in the open state when the selected level of pressure is present at any of the plurality of ports. The valve system may be kept in the closed state in response to an absence of the fluid being at the selected level of pressure at all of the plurality of ports.

17 Claims, 16 Drawing Sheets

| 502 | 504 | 506 | 508 | 510 | 512 | 514 |
|---|---|---|---|---|---|---|
| CAUSE OF TELESCOPE MOVEMENT | TELESCOPE MOVEMENT | TELESCOPE CONTROL VALVE POSITION | FIRST PORT | SECOND PORT | THIRD PORT | FOURTH PORT |
| TANKER | EXTEND | EXTEND | HI | (LOW) | (HI) | LOW |
| TANKER | RETRACT | RETRACT | (LOW) | HI | LOW | (HI) |
| RECEIVER | EXTEND | OFF | LOW | (HI) | (LOW) | HI |
| RECEIVER | RETRACT | OFF | (HI) | LOW | (LOW) | HI |
| | STATIONARY | | | | | |

FIG. 5

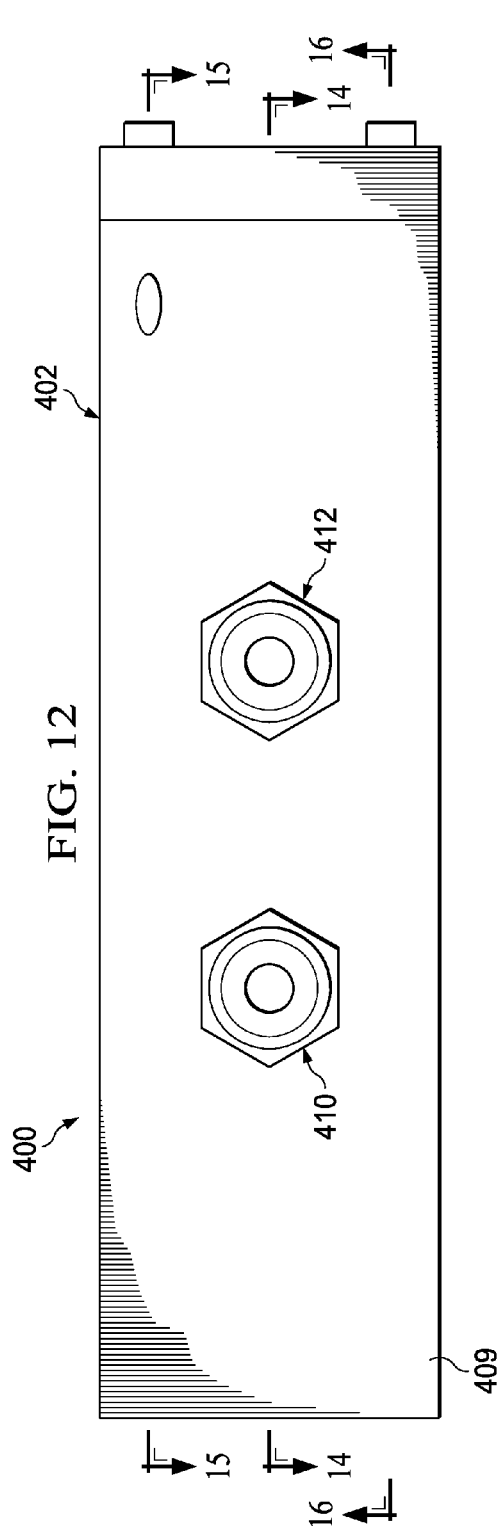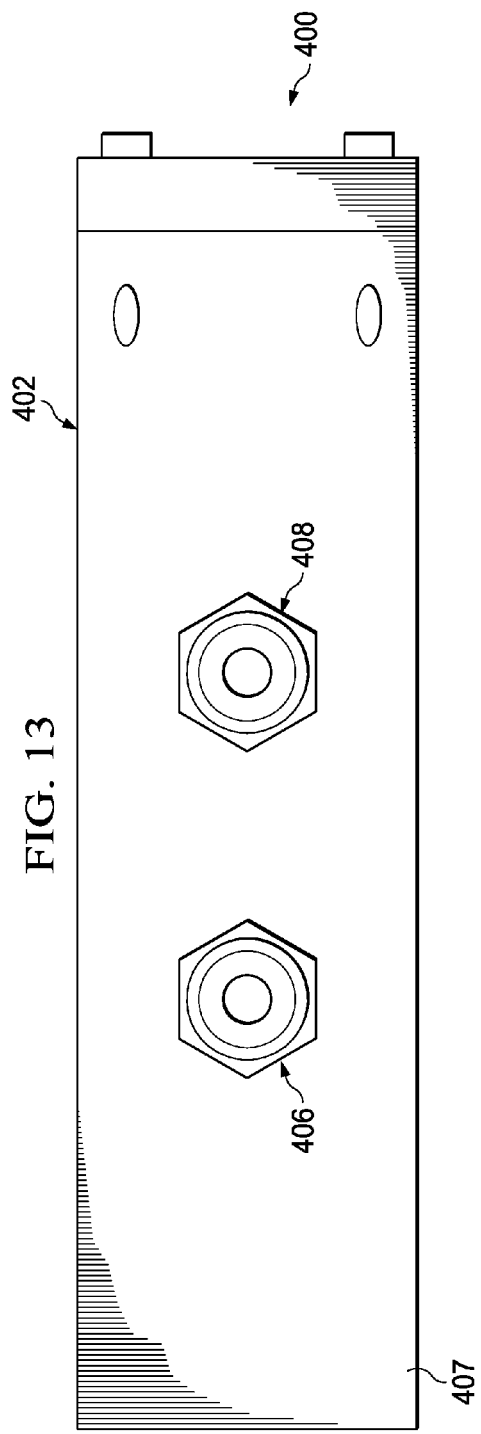

CONTROL VALVE FOR A HYDRAULIC REFUELING BOOM SYSTEM

BACKGROUND INFORMATION

1. Field

The present disclosure relates generally to refueling systems and, in particular, to valves used in refueling systems. Still more particularly, the present disclosure relates to a control valve for controlling the extension of a refueling boom on a tanker aircraft.

2. Background

Aerial refueling may be a process of transferring fuel from one aircraft to another aircraft while the aircraft are in flight. The aircraft from which the fuel originates may be referred to as a tanker aircraft. The aircraft receiving the fuel may be referred to as a receiver aircraft. Aerial refueling may be used with different types of aircraft as the tanker aircraft and/or receiver aircraft. These different types of aircraft may include, for example, without limitation, fixed wing aircraft, rotor wing aircraft, and/or other suitable types of aircraft.

One common approach for aerial refueling may involve a refueling boom and receptacle system. The refueling boom may be associated with the tanker aircraft. The receptacle system may be associated with the receiver aircraft. The refueling boom may be attached to the rear of the tanker aircraft and may move along three axes relative to the tanker. The refueling boom also may be a flexible refueling boom. An operator may extend and/or position the refueling boom for insertion into a receptacle on the receiver aircraft to transfer fuel to the receiving aircraft.

The refueling boom may comprise a fixed tube and a telescoping tube. This type of refueling boom may also be referred to as a telescoping refueling boom. The telescoping tube may allow the refueling boom to be extended and/or retracted along an axis through the length of the refueling boom. With currently available refueling booms, a hydraulic motor may control the extension and/or retraction of the telescoping tube of the refueling boom.

With these types of currently available refueling booms, the telescoping boom may extend in an undesired manner. These refueling booms may not have an optimal mechanism for stopping undesired extension of the telescoping tube of the refueling boom. This undesired extension of the telescoping tube may cause undesired results.

Therefore, it would be desirable to have a method and apparatus that may overcome one or more of the issues described above, as well as other possible issues.

SUMMARY

In one advantageous embodiment, an apparatus may comprise a housing, a plurality of ports on the housing, and a valve system located inside the housing. The valve system may be configured to be in a closed state when an absence of a selected level of pressure is present at all of the plurality of ports and in an open state when the selected level of pressure is present at any of the plurality of ports.

In another advantageous embodiment, a hydraulic control system for a hydraulic motor may be configured to move a telescoping boom in an aircraft. The hydraulic control system may comprise a housing, a plurality of ports on the housing, a number of one way valves, and a valve system located inside the housing. The plurality of ports may comprise a first port, a second port, a third port, and a fourth port. The first port and the second port may be connected to a controller, and the third port and the fourth port may be connected to the hydraulic motor. The controller may control the hydraulic motor to control movement of the telescoping boom. Each of the number of one way valves may be associated with a port in the plurality of ports and a cavity in the housing. Each of the number of one way valves may be configured to pass a fluid from a corresponding port into the cavity to generate a pressure. The number of one way valves may comprise at least one of a number of check valves and a number of shuttle valves. The housing, the plurality of ports, the number of one way valves, and the valve system may form a valve. The valve system may be configured to be in a closed state when an absence of a selected level of pressure is present at all of the plurality of ports and in an open state when the selected level of pressure is present at any of the plurality of ports. The valve system may comprise a number of flow valves biased to block the plurality of ports when the selected level of pressure is absent at all of the plurality of ports. The pressure generated by passing the fluid into the cavity may move the number of flow valves into the open state when the selected level of pressure is present at any of the plurality of ports. The return system may be configured to allow the fluid to flow from the cavity into a number of ports in the plurality of ports. The return system may comprise a flow restrictor and a second number of one way valves.

In still yet another advantageous embodiment, a method for controlling fluid flow may be provided. A valve system may be kept in an open state in response to a fluid being at a selected level of pressure at any of a plurality of ports in a valve. The valve system may be for the valve and the valve may comprise a housing, the plurality of ports on the housing, and the valve system located inside the housing. The valve system may be configured to be in a closed state when an absence of the selected level of pressure is present at all of the plurality of ports and in the open state when the selected level of pressure is present at any of the plurality of ports. The valve system may be kept in the closed state in response to an absence of the fluid being at the selected level of pressure at all of the plurality of ports.

In another advantageous embodiment, a method for controlling fluid flow for a hydraulic motor in a refueling system for an aircraft may be provided. A valve system may be kept in an open state in response to a fluid being at a selected level of pressure at any of a plurality of ports in a valve. The valve system may be for the valve in which the valve may comprise a housing, the plurality of ports on the housing, and the valve system located inside the housing. The plurality of ports may comprise a first port, a second port, a third port, and a fourth port. The first port and the second port may be connected to a controller for controlling a refueling boom in the refueling system, and the third port and the fourth port may be connected to the hydraulic motor. The valve system may be configured to be in a closed state when an absence of the selected level of pressure is present at all of the plurality of ports and in the open state when the selected level of pressure is present at any of the plurality of ports. The valve system may comprise a number of flow valves. The number of flow valves may be biased to block the plurality of ports when the selected level of pressure is absent at all of the plurality of ports to keep the valve system in the closed state in response to an absence of the fluid being at the selected level of pressure at all of the plurality of ports. The valve system may be changed from the closed state to the open state in response to the valve system being in the closed state and the fluid being at the selected level of pressure at any of the plurality of ports in the valve. The valve system may be changed from the open state to the closed state in response to the valve system being in the open state and the absence of the fluid being at the selected level of pressure at any of the plurality of ports in the valve. Fluid may be passed through a port in the plurality of ports to the hydraulic motor to cause the hydraulic motor to perform one of extending the refueling boom and retracting the refueling boom in response to the valve system being in the open state. The fluid may be allowed to flow from a cavity in the housing into a number of ports in the plurality of ports.

The features, functions, and advantages may be achieved independently in various embodiments of the present disclosure or may be combined in yet other embodiments in which further details may be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 5 is an illustration of a table of conditions for a valve in accordance with an advantageous embodiment;

FIG. 12 is an illustration of a side view of a valve in accordance with an advantageous embodiment;

FIG. 13 is an illustration of a side view of a valve in accordance with an advantageous embodiment;

DETAILED DESCRIPTION

Figure 1:
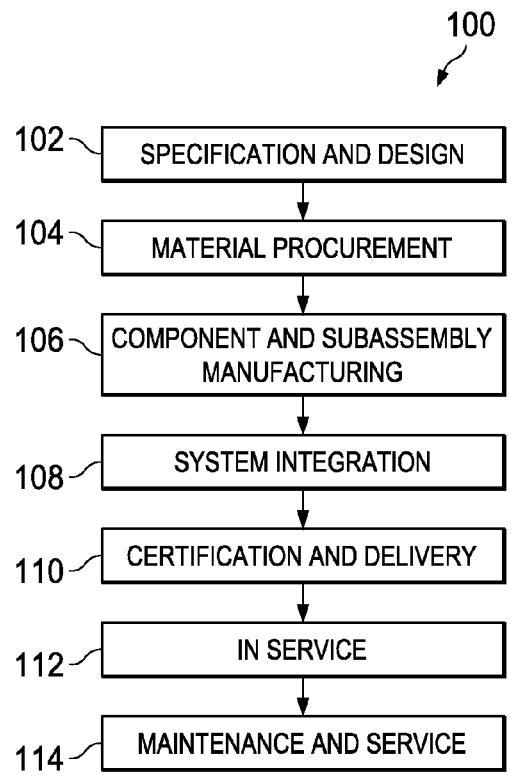
FIG. 1 is an illustration of an aircraft manufacturing and service method in accordance with an advantageous embodiment.
Figure 2:
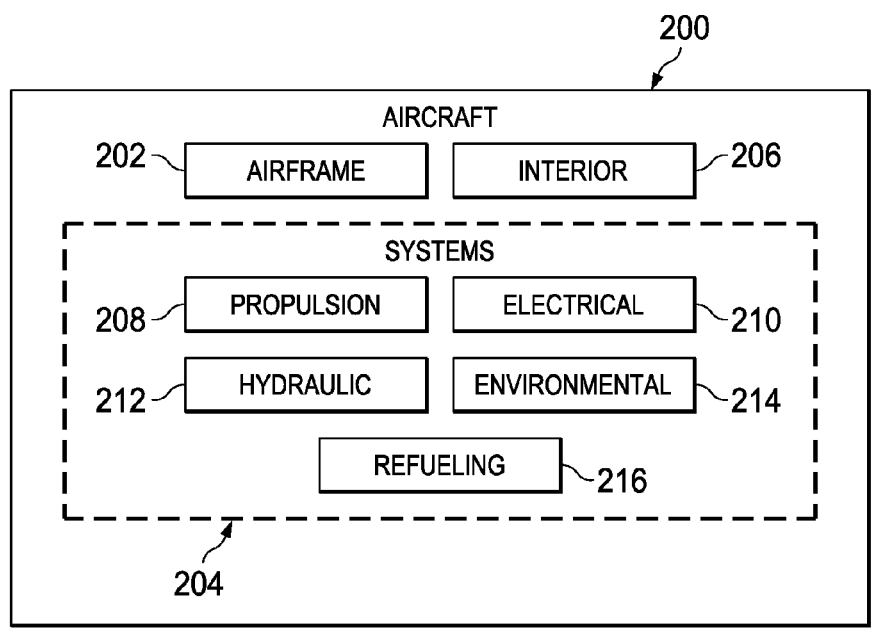
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service 112 by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of venders, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of systems 204 include one or more of propulsion system 208, electrical system 210, hydraulic system 212, environmental system 214, and refueling system 216. Any number of other systems may be included. Although an aerospace example is shown, different advantageous embodiments may be applied to other industries, such as the automotive industry or the heavy equipment industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

In one illustrative example, components or subassemblies produced in component and subassembly manufacturing 106 in FIG. 1 may be fabricated or manufactured in a manner similar to components or subassemblies produced while aircraft 200 in FIG. 2 is in service 112 in FIG. 1. As yet another example, a number of apparatus embodiments, method embodiments, or a combination thereof may be utilized during production stages, such as component and subassembly manufacturing 106 and system integration 108 in FIG. 1.

A number, when referring to items, means one or more items. For example, a number of apparatus embodiments may be one or more apparatus embodiments. A number of apparatus embodiments, method embodiments, or a combination thereof may be utilized while aircraft 200 in FIG. 2 is in service 112 and/or during maintenance and service 114 in FIG. 1. The use of a number of the different advantageous embodiments may substantially expedite the assembly of and/or reduce the cost of aircraft 200 in FIG. 2.

The different advantageous embodiments recognize and take into account a number of different considerations. For example, without limitation, the different advantageous embodiments recognize and take into account that currently available refueling booms may have hydraulic motors that control the extension and/or retraction of the telescoping tubes of the refueling booms. These hydraulic motors may use pressure relief valves to control the extension and/or retraction of the telescoping tubes.

The different advantageous embodiments recognize and take into account that these pressure relief valves may not operate as desired when hydraulic pressure is lost. When these pressure relief valves do not operate as desired, the hydraulic motors may allow undesired extension and/or undesired retraction of the telescoping tube. For example, without limitation, when a pressure relief valve is not operating as desired, the telescoping tube may be allowed to extend without a way to stop the extension and/or retract the telescoping tube. Further, the telescoping tube may be allowed to extend to a fully extended length.

The different advantageous embodiments recognize and take into account that hydraulic pressure may be lost for a number of reasons. As one illustrative example, hydraulic pressure may be lost when the housing for the control system pressure relief valve cracks or has other undesired inconsistencies. The different advantageous embodiments recognize and take into account that currently available refueling booms may not have a failsafe mechanism for stopping the extension of the telescoping tube when hydraulic pressure is lost and the pressure relief valves do not operate as desired.

The different advantageous embodiments also recognize and take into account that undesired extension of the telescoping tube of the refueling boom may cause undesired effects on the receiver aircraft. These undesired effects may include, for example, without limitation, scratches on the surface of the receiver aircraft, cracks in the windows of the receiver aircraft, undesired effects on the receptacle of the receiver aircraft, and/or other undesired effects. Further, undesired extension of the telescoping tube may have undesired effects on the telescoping tube.

Thus, the different advantageous embodiments provide a valve for controlling an extension of a refueling boom. In one advantageous embodiment, the valve may comprise a housing, a plurality of ports on the housing, and a valve system located inside the housing. The valve system may be configured to be in a closed state when an absence of a selected level of pressure is present at all of the plurality of ports and in an open state when the selected level of pressure is present at any of the plurality of ports.

Figure 3:
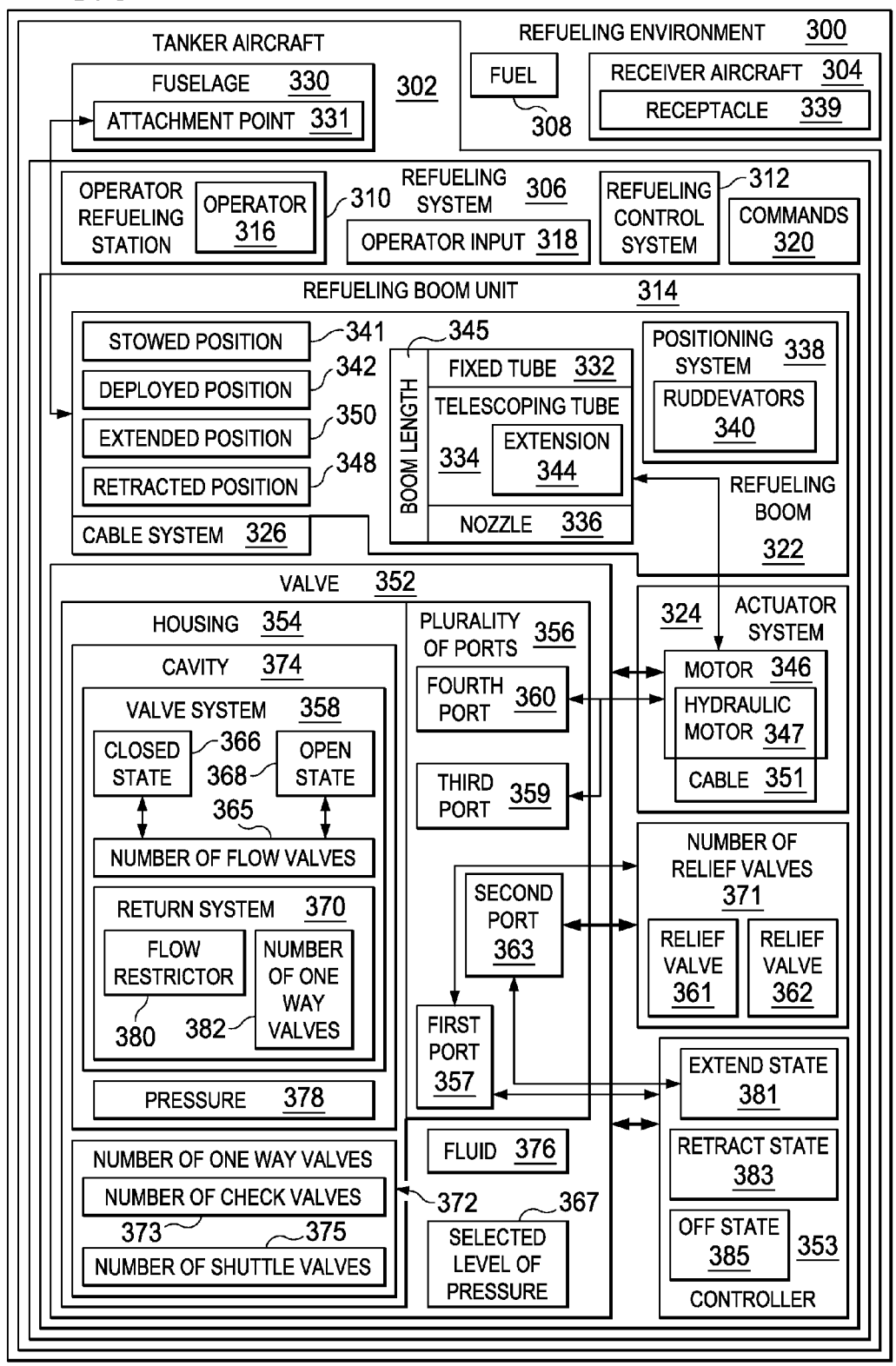
FIG. 3 is an illustration of a refueling environment in accordance with an advantageous embodiment.

With reference now to FIG. 3, an illustration of a refueling environment is depicted in accordance with an advantageous embodiment. In this illustrative example, refueling environment 300 may include tanker aircraft 302 and receiver aircraft 304. Tanker aircraft 302 may be one example of an implementation for aircraft 200 in FIG. 2.

As depicted, tanker aircraft 302 may have refueling system 306. Refueling system 306 may be an example of one implementation for refueling system 216 in FIG. 2. Tanker aircraft 302 uses refueling system 306 to provide fuel 308 to receiver aircraft 304. For example, without limitation, tanker aircraft 302 may provide fuel 308 to receiver aircraft 304 using refueling system 306 while receiver aircraft 304 is in flight.

In this illustrative example, refueling system 306 may be comprised of a number of components. These components may include, for example, without limitation, operator refueling station 310, refueling control system 312, and refueling boom unit 314. Operator refueling station 310 may provide a location for operator 316 to control refueling boom unit 314.

For example, without limitation, operator refueling station 310 may send operator input 318 from operator 316 to refueling control system 312. In turn, refueling control system 312 may generate commands 320, which may be sent to refueling boom unit 314 to control refueling boom 322. For example, without limitation, commands 320 may be sent to refueling boom unit 314 to move refueling boom 322.

In these illustrative examples, refueling boom unit 314 may include refueling boom 322, actuator system 324, cable system 326, and other suitable components. Refueling boom 322 may be attached to fuselage 330 of tanker aircraft 302 at attachment point 331 on fuselage 330. As depicted, refueling boom 322 may comprise fixed tube 332, telescoping tube 334, nozzle 336, positioning system 338, and other suitable components. Nozzle 336 may be used to transfer fuel 308 from tanker aircraft 302 to receptacle 339 of receiver aircraft 304.

As depicted, actuator system 324 may control positioning system 338 to move refueling boom 322. For example, without limitation, actuator system 324 may control positioning system 338 in response to commands 320 from refueling control system 312. Refueling boom 322 may be moved with respect to tanker aircraft 302 to which refueling boom unit 314 is attached. Positioning system 338 may take the form of ruddevators 340 in this illustrative example.

Cable system 326 may raise and/or lower refueling boom 322 between stowed position 341 and deployed position 342 for refueling boom 322. Further, cable system 326 may provide support for refueling boom 322 in deployed position 342.

In this illustrative example, telescoping tube 334 may move with respect to fixed tube 332 to provide extension 344 for telescoping tube 334. Extension 344 may change. When extension 344 changes, boom length 345 of refueling boom 322 may also change. For example, without limitation, boom length 345 may change by changing extension 344 for telescoping tube 334 such that boom length 345 is increased or decreased. Boom length 345 may be the length of fixed tube 332, telescoping tube 334, and nozzle 336.

Extension 344 for telescoping tube 334 may be controlled by actuator system 324. In particular, extension 344 may be controlled by motor 346 in actuator system 324. Motor 346 may take the form of hydraulic motor 347 in this illustrative example. Motor 346 may be configured to move refueling boom 322 between retracted position 348 and extended position 350. More specifically, hydraulic motor 347 may be configured to provide extension 344 for telescoping tube 334 to move refueling boom 322 between retracted position 348 and extended position 350.

Hydraulic motor 347 may be a mechanical apparatus configured to convert hydraulic pressure and flow into torque and angular displacement. Angular displacement may be rotation. This rotation may allow a cable, such as cable 351 associated with hydraulic motor 347, to be retracted and extended.

A first component may be considered to be associated with a second component by being secured to the second component, attached to the second component, bonded to the second component, fastened to the second component, mounted to the second component, and/or connected to the second component in some other suitable manner. The first component also may be connected to the second component by using a third component. The first component may be considered to be associated with the second component by being formed as part of and/or an extension of the second component.

Cable 351 may also be associated with telescoping tube 334. In this manner, retracting and extending cable 351 using hydraulic motor 347 allows telescoping tube 334 to be retracted and extended, respectively.

In this depicted example, movement of hydraulic motor 347 may be controlled by controller 353. Controller 353 may be in one of extend state 381, retract state 383, and off state 385. When controller 353 is in extend state 381, controller 353 may cause hydraulic motor 347 to move to extend telescoping tube 334. When controller 353 is in retract state 383, controller 353 may cause hydraulic motor 347 to move to retract telescoping tube 334. When controller 353 is in off state 385, hydraulic motor 347 may not move. In other words, hydraulic motor 347 may be locked.

In this illustrative example, valve 352 may be connected to motor 346 and controller 353. Valve 352 may be configured to control extension 344 of telescoping tube 334. Valve 352 may comprise housing 354, plurality of ports 356 on housing 354, and valve system 358. Valve system 358 may be located inside housing 354.

Plurality of ports 356 may include first port 357, second port 363, third port 359, and fourth port 360. First port 357 and second port 363 may be connected to controller 353. Third port 359 and fourth port 360 may be connected to motor 346.

Valve system 358 may be configured to be in closed state 366 when an absence of selected level of pressure 367 is present at all of plurality of ports 356. Further, valve system 358 may be configured to be in open state 368 when selected level of pressure 367 is present at any of plurality of ports 356. For example, without limitation, valve system 358 may be in open state 368 when selected level of pressure 367 is present in at least one of plurality of ports 356.

As used herein, the phrase "at least one of", when used with a list of items, means that different combinations of one or more of the listed items may be used and only one of each item in the list may be needed. For example, "at least one of item A, item B, and item C" may include, for example, without limitation, item A or item A and item B. This example also may include item A, item B, and item C or item B and item C.

Valve system 358 may comprise number of flow valves 365 and return system 370. Number of flow valves 365 may be biased to block plurality of ports 356 when selected level of pressure 367 is absent from all of plurality of ports 356. When number of flow valves 365 blocks plurality of ports 356, valve system 358 may be in closed state 366. When number of flow valves 365 does not block plurality of ports 356, valve system 358 may be in open state 368.

In this illustrative example, valve 352 may also include number of one way valves 372. Each of number of one way valves 372 may allow fluid 376 to flow in only one direction. Fluid 376 may take a number of different forms. For example, without limitation, fluid 376 may take the form of a liquid, such as a hydraulic fluid, or a gas, such as pressurized air.

Number of one way valves 372 may include at least one of number of check valves 373 and number of shuttle valves 375. Each of number of check valves 373 may have one inlet and one outlet. In other words, each of number of check valves 373 may receive fluid 376 from one source and allow fluid 376 to pass through number of check valves 373. Fluid 376 may be allowed to pass through a check valve in number of check valves 373 when the pressure at the check valve is greater than two pounds per square inch to five pounds per square inch.

Each of number of shuttle valves 375 may have two inlets and one outlet. In other words, each of number of shuttle valves 375 may receive fluid 376 from two different sources. Each of number of shuttle valves 375 may only allow fluid 376 from one source to pass through the outlet of the shuttle valve at a time.

As depicted, number of one way valves 372 may be connected to a port in plurality of ports 356 and cavity 374 in housing 354. Valve system 358 may be located within cavity 374 in housing 354. Each of number of one way valves 372 may be configured to pass fluid 376 from a corresponding port in plurality of ports 356 into cavity 374.

Fluid 376 in cavity 374 may generate pressure 378. When selected level of pressure 367 is present at any of plurality of ports 356, fluid 376 may flow into cavity 374 such that pressure 378 may cause number of flow valves 365 to not block plurality of ports 356. In this manner, pressure 378 may move valve system 358 into open state 368.

In this illustrative example, return system 370 may be configured to allow fluid 376 to flow from cavity 374 into at least a portion of plurality of ports 356. For example, without limitation, return system 370 may allow fluid 376 to return to first port 357 and second port 363.

As depicted, return system 370 may comprise flow restrictor 380 and number of one way valves 382. Flow restrictor 380 may limit the amount and/or pressure of fluid 376 that returns to first port 357 and second port 363. Number of one way valves 382 may take the form of a number of check valves in these illustrative examples.

When fluid 376 returns to first port 357 and second port 363 from cavity 374, pressure 378 may be reduced. This reduction of pressure 378 may allow number of flow valves 365 for valve system 358 to move into closed state 366.

In some advantageous embodiments, first port 357 and second port 363 may be connected to number of relief valves 371 in valve 352. Number of relief valves 371 may include relief valve 361 and relief valve 362. Fluid 376 may flow through relief valve 361 in a direction from first port 357 to second port 363. Fluid 376 may flow through relief valve 362 in a direction from second port 363 to first port 357.

Number of relief valves 371 may be used to cause movement of hydraulic motor 347 when controller 353 is in off state 385. As one illustrative example, receiver aircraft 304 may cause movement of telescoping tube 334 when receiver aircraft 304 is connected to refueling boom unit 314. For example, without limitation, receiver aircraft 304 may pull telescoping tube 334 towards receiver aircraft 304 or push telescoping tube 334 into refueling boom 322.

Pressure may be generated at number of relief valves 371 when telescoping tube 334 is pulled and/or pushed by receiver aircraft 304. When the pressure at number of relief valves 371 is greater than some selected level of pressure, fluid 376 may be allowed to pass through number of relief valves 371. Fluid 376 passing through number of relief valves 371 may cause hydraulic motor 347 to move.

For example, without limitation, fluid 376 passing through relief valve 361 may cause hydraulic motor 347 to move to allow retraction of telescoping tube 334. Fluid 376 passing through relief valve 362 may cause hydraulic motor 347 to move to allow extension of telescoping tube 334. In this manner, the extension and/or retraction of telescoping tube 334 in response to receiver aircraft 304 pushing and/or pulling on telescoping tube 334 may be controlled.

In other advantageous embodiments, number of relief valves 371 may not be part of valve 352. Number of relief valves 371 may be connected between valve 352 and controller 353.

The illustration of refueling environment 300 in FIG. 3 is not meant to imply physical or architectural limitations to the manner in which different refueling environments may be implemented. For example, other components in addition to or in place of the ones illustrated may be used. Also, in some advantageous embodiments, fewer components than those illustrated for refueling environment 300 may be used.

In other advantageous embodiments, valve 352 may be used with other systems other than refueling system 306. For example, without limitation, valve 352 may be used with other systems having hydraulic motors. These other systems may include, for example, without limitation, an elevator system, a hydraulic crane, an escalator system, or some other suitable system.

In some advantageous embodiments, return system 370 may include a flow orifice in place of flow restrictor 380.

Figure 4:
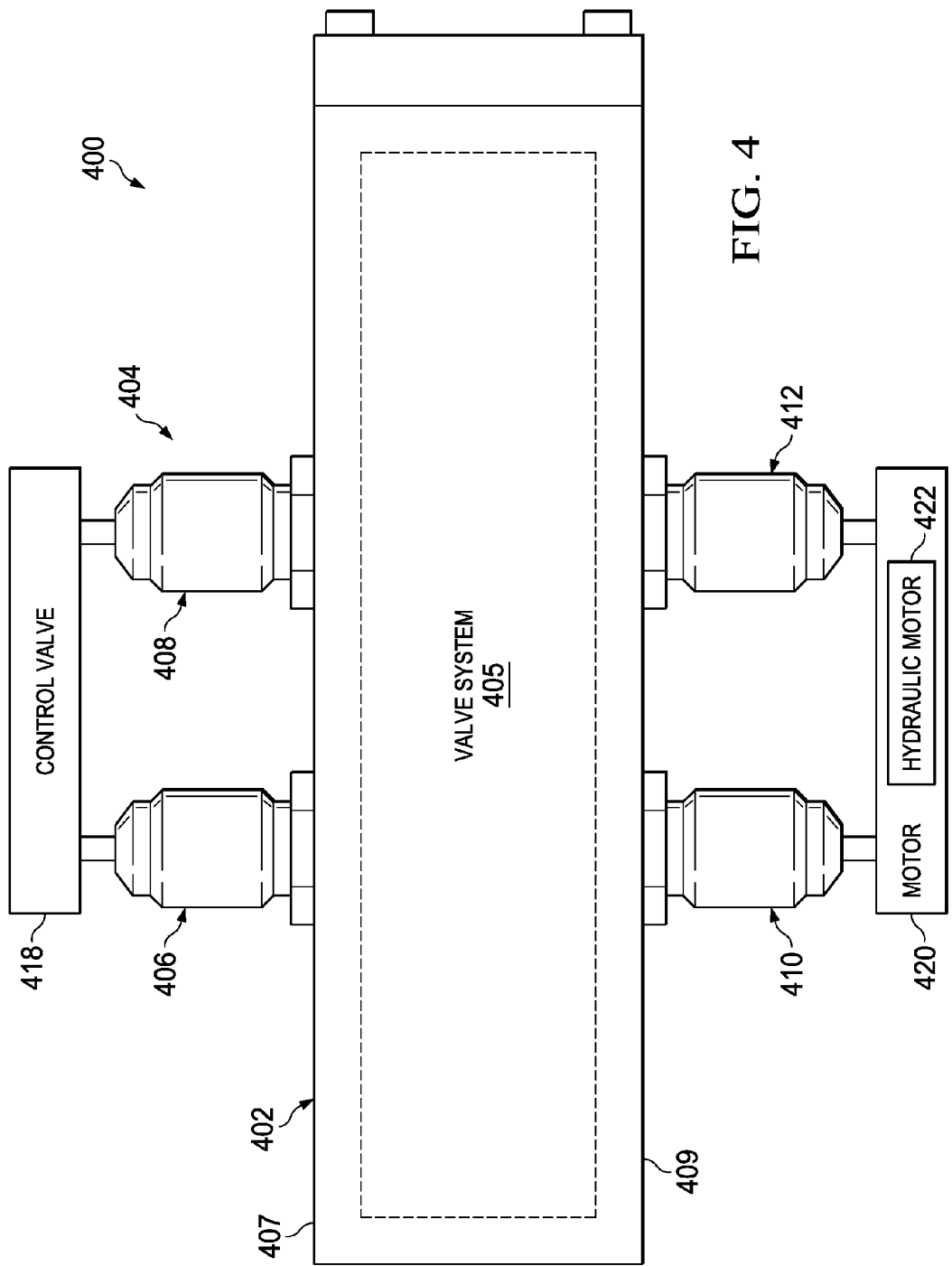
FIG. 4 is an illustration of a valve in accordance with an advantageous embodiment.

With reference now to FIG. 4, an illustration of a valve is depicted in accordance with an advantageous embodiment. In this illustrative example, valve 400 may be an example of one implementation for valve 352 in FIG. 3.

Valve 400 may comprise housing 402, plurality of ports 404 on housing 402, and valve system 405. Valve system 405 may be located inside housing 402.

As depicted, plurality of ports 404 may include first port 406, second port 408, third port 410, and fourth port 412. First port 406 and second port 408 may be located on side 407 of housing 402. Third port 410 and fourth port 412 may be located on side 409 of housing 402.

In this illustrative example, first port 406 and second port 408 may be connected to control valve 418. Third port 410 and fourth port 412 may be connected to motor 420. Control valve 418 may be an example of one implementation for controller 353 in FIG. 3.

Motor 420 may be an example of one implementation for motor 346 in FIG. 3. Motor 420 may take the form of hydraulic motor 422 in this depicted example.

Control valve 418 may take the form of a pressure relief valve in this depicted example. A pressure relief valve is a type of valve used to control or limit the pressure in a system. When the pressure reaches a particular level of pressure, the pressure relief valve may open and allow fluid to flow through the valve.

Control valve 418 may control the amount of pressure needed to cause motor 420 to extend and/or retract the telescoping tube. In this illustrative example, control valve 418 may be controlled by an operator.

With reference now to FIG. 5, an illustration of a table of conditions for a valve is depicted in accordance with an advantageous embodiment. In this illustrative example, table 500 may describe conditions for valve 400 in FIG. 4 in which valve 400 may control the movement of a telescoping tube of a refueling boom.

Table 500 may include columns 501 and rows 503. As depicted, columns 501 may include cause of telescope movement 502, telescope movement 504, telescope control valve position 506, first port 508, second port 510, third port 512, and fourth port 514.

Cause of telescope movement 502 may indicate whether the tanker aircraft or the receiver aircraft is causing movement of the telescoping tube. Telescope movement 504 may indicate the type of movement of the telescoping tube. For example, without limitation, telescope movement 504 may indicate that the telescoping tube is extending, retracting, or stationary.

Telescope control valve position 506 may indicate the state of control valve 418 in FIG. 4. For example, without limitation, control valve 418 in FIG. 4 may be in an extend state, a retract state, or an off state. Control valve 418 in FIG. 4 may be in an off state when control valve 418 does not cause extension and/or retraction of the telescoping tube. In other words, when control valve 418 is in the off state, movement of the telescoping tube is caused by the receiver aircraft.

First port 508 may indicate the level of pressure at first port 406 in FIG. 4. Second port 510 may indicate the level of pressure at second port 408 in FIG. 4. Third port 512 may indicate the level of pressure at third port 410 in FIG. 4. Fourth port 514 may indicate the level of pressure at fourth port 412 in FIG. 4. Fluid, such as fluid 376 in FIG. 3, may flow into or out of these ports, depending on the levels of pressure present at these ports.

In this illustrative example, rows 503 may include first condition 515, second condition 516, third condition 518, fourth condition 520, and fifth condition 522. In first condition 515, the tanker aircraft may cause extension of the telescoping tube with control valve 418 in FIG. 4 in an extend state. Further, in first condition 515, a high level of pressure may be present at first port 406 and third port 410 in FIG. 4. A low level of pressure may be present at second port 408 and fourth port 412 in FIG. 4. The fluid may flow out of second port 408 and third port 410 in FIG. 4.

A high level of pressure may be pressure at a selected level. The selected level of pressure may be selected level of pressure 367 in FIG. 3. For example, without limitation, the selected level of pressure for the high level of pressure may be between about 151 pounds per square inch gauge (psig) and about 3,150 pounds per square inch gauge. A low level of pressure may be pressure lower than the selected level of pressure. For example, without limitation, a low level of pressure may be pressure lower than about 151 pounds per square inch gauge.

In second condition 516, the tanker aircraft may cause retraction of the telescoping tube with control valve 418 in FIG. 4 in the retract state. Further, in second condition 516, a low level of pressure may be present at first port 406 and third port 410 in FIG. 4. A high level of pressure may be present at second port 408 and fourth port 412 in FIG. 4. The fluid may flow out of first port 406 and fourth port 412 in FIG. 4 in this example.

In third condition 518, the receiver aircraft may cause extension of the telescoping tube with control valve 418 in FIG. 4 in an off state. For example, without limitation, the receiver aircraft may pull the telescoping tube such that the telescoping tube extends. A low level of pressure may be present at first port 406 and third port 410 in FIG. 4 in third condition 518. Further, a high level of pressure may be present at second port 408 and fourth port 412 in FIG. 4. The fluid may flow out of second port 408 and third port 410 in FIG. 4.

In fourth condition 520, the receiver aircraft may cause retraction of the telescoping tube with control valve 418 in FIG. 4 in an off state. For example, without limitation, the receiver aircraft may push the telescoping tube such that the telescoping tube retracts. A high level of pressure may be present at first port 406 and third port 410 in FIG. 4 in fourth condition 520. A low level of pressure may be present at second port 408 and fourth port 412 in FIG. 4. The fluid may flow out of first port 406 and fourth port 412 in FIG. 4.

In fifth condition 522, the telescoping tube may be stationary. In other words, neither the tanker aircraft nor the receiver aircraft may cause movement of the telescoping tube. Control valve 418 in FIG. 4 may be in the off state in fifth condition 522. Further, a low level of pressure may be present at first port 406 and third port 410 in FIG. 4. A high level of pressure may be present at second port 408 and fourth port 412 in FIG. 4. The fluid may flow out of second port 408 and third port 410 in FIG. 4.

Figure 6:
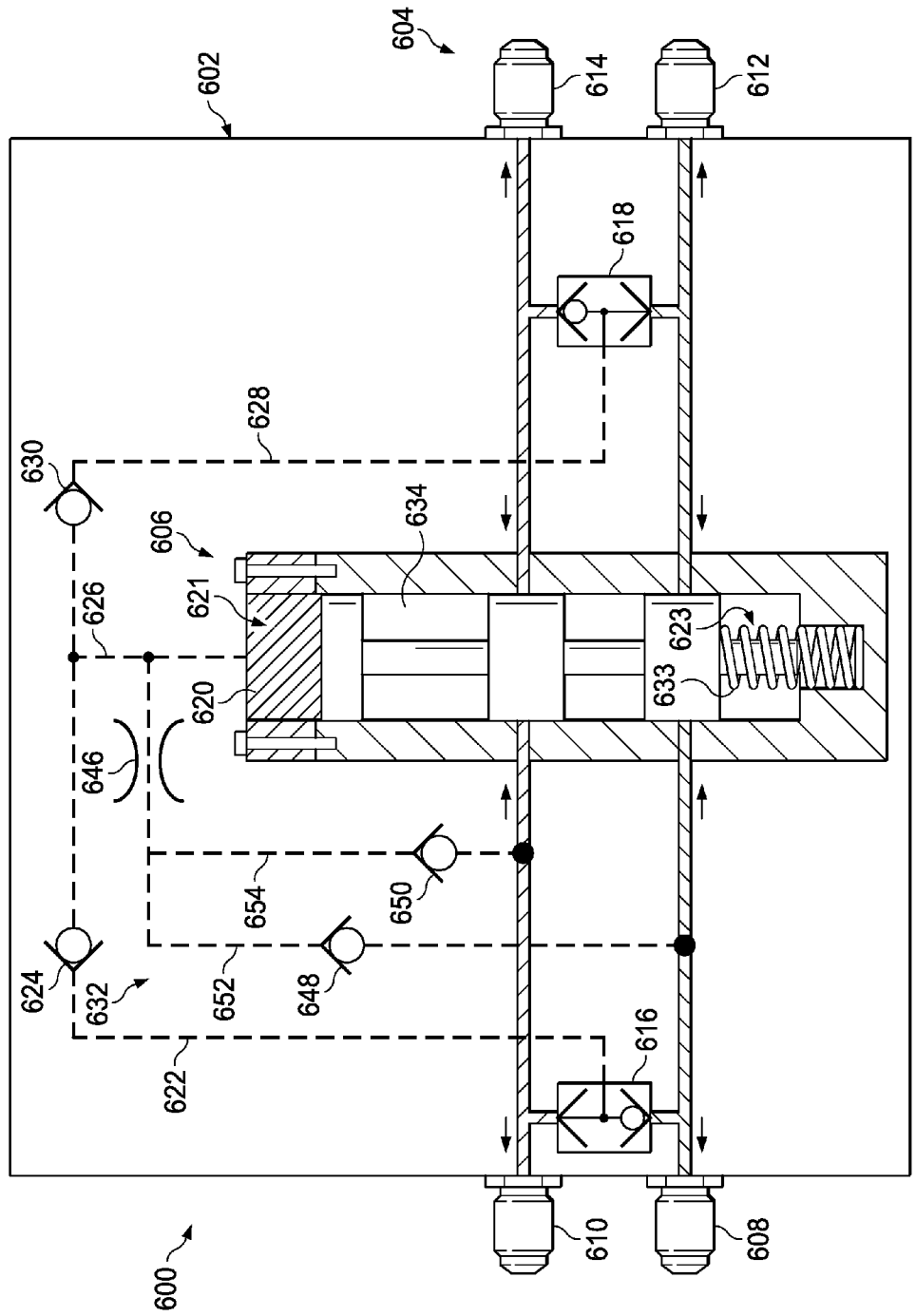
FIG. 6 is an illustration of a valve in accordance with an advantageous embodiment.

With reference now to FIG. 6, an illustration of a valve is depicted in accordance with an advantageous embodiment. In this illustrative example, valve 600 may be an example of one implementation for valve 352 in FIG. 3. As depicted, valve 600 may comprise housing 602, plurality of ports 604 on housing 602, and valve system 606 inside housing 602.

As depicted, plurality of ports 604 may include first port 608, second port 610, third port 612, and fourth port 614. First port 608 and second port 610 may be connected to a controller, such as controller 353 in FIG. 3 and/or control valve 418 in FIG. 4. Third port 612 and fourth port 614 may be connected to a motor, such as motor 346 in FIG. 3 and/or motor 420 in FIG. 4.

In this illustrative example, valve 600 may also comprise shuttle valve 616 and shuttle valve 618. Shuttle valve 616 and shuttle valve 618 may be examples of implementations for one way valves in number of one way valves 372 in FIG. 3. Shuttle valve 616 may allow fluid from either first port 608 or second port 610 to flow into line 622. For example, without limitation, shuttle valve 616 may block flow from one of first port 608 and second port 610 while allowing flow from the other port into line 622.

As one illustrative example, without limitation, when the pressure at first port 608 is at a selected level of pressure, shuttle valve 616 may allow fluid from first port 608 to flow into line 622. Shuttle valve 616 may also block the fluid in second port 610 from flowing into line 622 while fluid flows into line 622 from first port 608. Fluid in line 622 may pass through check valve 624 into line 626. Fluid in line 626 may flow from line 626 into cavity 620 in housing 602. In particular, fluid in line 626 may flow from line 626 into portion 621 of cavity 620 in housing 602.

In a similar manner, shuttle valve 618 may allow fluid from either third port 612 or fourth port 614 to flow into line 628, through check valve 630, into line 626, and into portion 621 of cavity 620 in housing 602.

In this illustrative example, valve system 606 may be located in cavity 620 of housing 602. Valve system 606 may include flow valve 634. Flow valve 634 may be biased by spring 633 to be in a closed state for valve system 606. In particular, flow valve 634 may be biased by spring 633 to block plurality of ports 604. Spring 633 may be located in portion 623 of cavity 620.

In this depicted example, the spring constant, k, for spring 633 may be selected to determine the pressure needed to move flow valve 634 into an open state from a closed state. For example, without limitation, the higher the spring constant for spring 633, the greater the pressure needed to cause flow valve 634 to be in the open state. Spring 633 may have a spring constant such that flow valve 634 is moved into an open state from a closed state at a pressure of greater than about 150 pounds per square inch gauge.

In other illustrative examples, flow valve 634 may be biased using some other mechanism other than spring 633. For example, without limitation, flow valve 634 may be biased by a compressible liquid (not shown) in portion 623 of cavity 620. As yet another example, flow valve 634 may be biased by a compressible gas (not shown) in portion 623 of cavity 620.

The presence of pressure at a selected level of pressure at any of plurality of ports 604 may cause fluid to flow into portion 621 of cavity 620 and put valve system 606 in an open state. For example, without limitation, the flow of fluid into portion 621 of cavity 620 may cause valve system 606 to move downwards and push down on spring 633. When valve system 606 is moved downwards, flow valve 634 may be moved to put valve system 606 into an open state.

When valve system 606 is in the open state, fluid may flow between first port 608 to third port 612. The fluid may flow from first port 608 to third port 612 or from third port 612 to first port 608. Further, fluid may flow between second port 610 and fourth port 614.

In the absence of the selected level of pressure at all of plurality of ports 604, valve system 606 may be in the closed state.

In this illustrative example, valve system 606 may also include return system 632. Return system 632 may include flow restrictor 646, check valve 648, and check valve 650. Flow restrictor 646 may allow fluid to flow through line 652 and line 654 when the selected level of pressure is not present at any of plurality of ports 604.

Fluid may flow through check valve 648 on line 652 and check valve 650 on line 654. The fluid may flow through line 652 to first port 608 and through line 654 to second port 610. In other words, fluid may bleed out of valve system 606 and into first port 608 and second port 610 through return system 632.

The flow of fluid through line 652 and line 654 may reduce the amount of fluid that is in portion 621 of cavity 620. This reduction of fluid in cavity 620 may cause spring 633 to move flow valve 634 into the closed state. In this manner, valve system 606 may return to the closed state.

With reference now to FIGS. 7-11, illustrations of a valve are depicted in accordance with an advantageous embodiment. Valve 700 is depicted with a number of conditions for the flow of fluid through valve 700 in FIGS. 7-11. Valve 700 may be an example of one implementation for valve 352 in FIG. 3.

Figure 7:
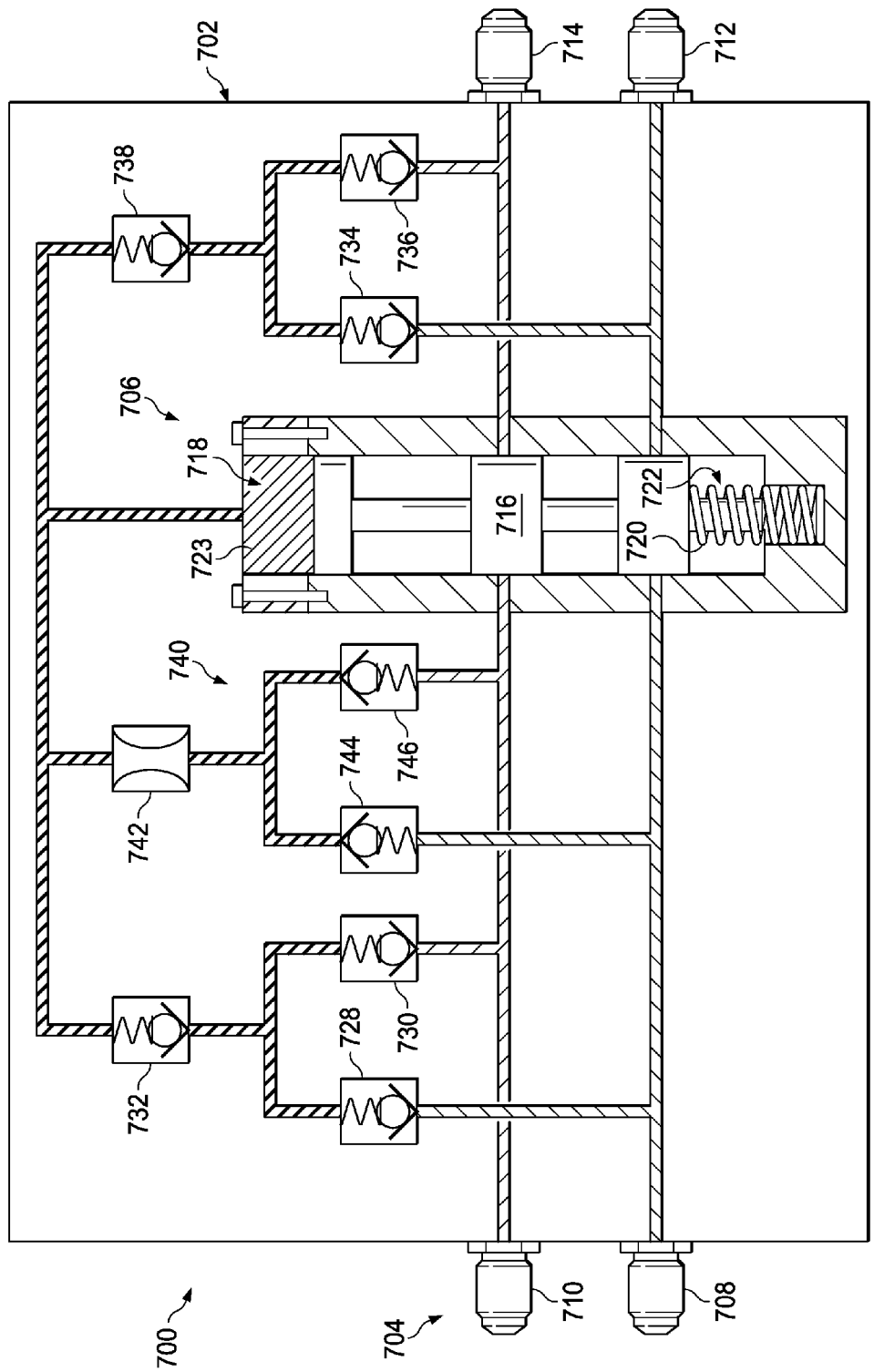
FIG. 7 is an illustration of a valve in accordance with an advantageous embodiment.

Turning now to FIG. 7, an illustration of valve 700 is depicted in accordance with an advantageous embodiment. Valve 700 may comprise housing 702, plurality of ports 704 on housing 702, and valve system 706 inside housing 702.

Plurality of ports 704 may include first port 708, second port 710, third port 712, and fourth port 714. First port 708 and second port 710 may be connected to a controller (not shown), such as controller 353 in FIG. 3 and/or control valve 418 in FIG. 4. Third port 712 and fourth port 714 may be connected to a motor (not shown), such as motor 346 in FIG. 3 and/or motor 420 in FIG. 4.

In this illustrative example, valve system 706 may comprise flow valve 716. Flow valve 716 may be located in cavity 718 in housing 702. Flow valve 716 may be biased to block plurality of ports 704 by spring 720. Spring 720 may be located in portion 722 of cavity 718.

When flow valve 716 is biased by spring 720 to block plurality of ports 704, flow valve 716 and valve system 706 may be in a closed state. Flow valve 716 may be in a closed state when each of plurality of ports 704 has an absence of a selected level of pressure. The selected level of pressure may be, for example, without limitation, selected level of pressure 367 in FIG. 3.

Flow valve 716 may be biased by spring 720 to block the flow of fluid between first port 708 and third port 712 and between second port 710 and fourth port 714. In other words, fluid may not flow from first port 708 to third port 712 or from third port 712 to first port 708 when flow valve 716 is biased by spring 720. Further, fluid may not flow from second port 710 to fourth port 714 or from fourth port 714 to second port 710 when flow valve 716 is biased by spring 720.

As depicted, valve 700 may also include check valves 728, 730, 732, 734, 736, and 738. Check valve 728 and check valve 730 may function in a manner similar to a shuttle valve.

For example, without limitation, when the pressure at first port 708 is greater than the pressure at second port 710, check valve 728 may open and allow fluid from first port 708 to flow through check valve 728. Check valve 730 may remain closed when check valve 728 is open.

Similarly, when the pressure at second port 710 is greater than the pressure at first port 708, check valve 730 may open and allow fluid from second port 710 to flow through check valve 730. Check valve 728 may remain closed when check valve 730 is open. In this manner, check valve 728 and check valve 730 may not be open at the same time.

These check valves may also allow fluid to pass through the check valves when the pressure is greater than a particular level of pressure. For example, without limitation, check valve 728 may allow fluid from first port 708 to pass through check valve 728 when the pressure is greater than two psi to five psi.

In a manner similar to check valve 728 and check valve 730, check valve 734 and check valve 736 may function as a shuttle valve for third port 712 and fourth port 714.

Fluid passing through check valve 728 and check valve 730 may pass through check valve 732 and into portion 723 of cavity 718 in housing 702. Fluid passing through check valve 734 and check valve 736 may pass through check valve 738 and into portion 723 of cavity 718.

The presence of pressure at a selected level of pressure at any of plurality of ports 704 may cause fluid to flow into portion 723 of cavity 718 and put valve system 706 in an open state. In other words, a particular amount of fluid in portion 723 of cavity 718 may cause flow valve 716 to move downwards into the open state.

Valve system 706 may also include return system 740. Return system 740 may include flow restrictor 742, check valve 744, and check valve 746. Fluid may flow out of cavity 718 and through flow restrictor 742 at a particular level of pressure. After passing flow restrictor 742, the fluid may flow through check valve 744 into first port 708 and through check valve 746 into second port 710.

Figure 8:
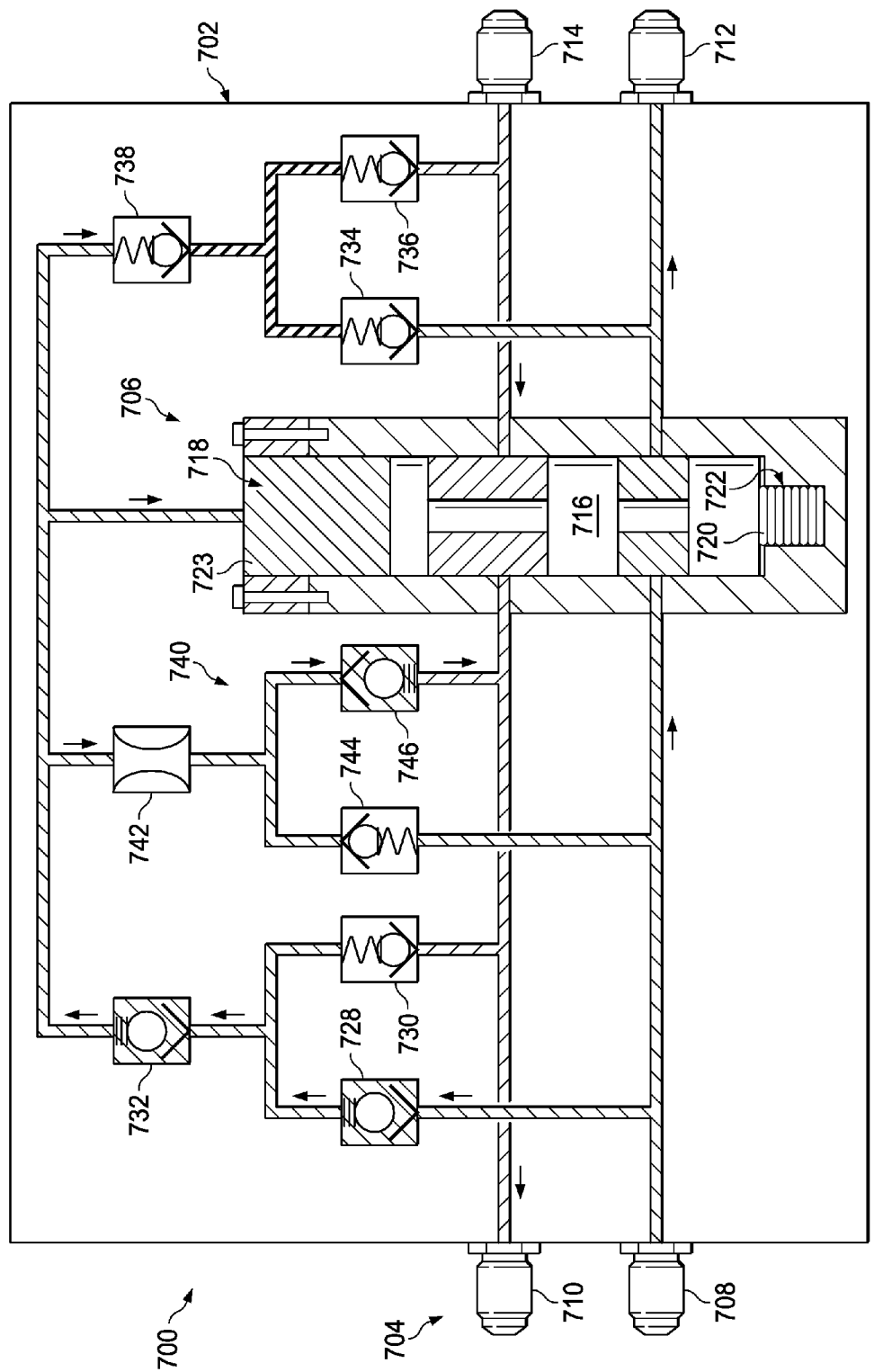
FIG. 8 is an illustration of a valve system in an open state in accordance with an advantageous embodiment.

With reference now to FIG. 8, an illustration of valve system 706 in an open state is depicted in accordance with an advantageous embodiment. In this illustrative example, valve system 706 may be in an open state in response to the tanker aircraft having valve 700 extending the refueling boom (not shown).

As depicted, fluid may flow from first port 708, through check valve 728, through check valve 732, and into portion 723 of cavity 718. Fluid from second port 710 may not be allowed to pass through check valve 730. The fluid in portion 723 of cavity 718 may cause flow valve 734 to move downwards and put valve system 706 in an open state. In this open state, fluid may be allowed to flow from first port 708 to third port 712. Fluid may also be allowed to flow from fourth port 714 to second port 710.

Further, as depicted, fluid may flow through return system 740. In this illustrative example, fluid may flow through flow restrictor 742, through check valve 746, and into second port 710.

Figure 9:
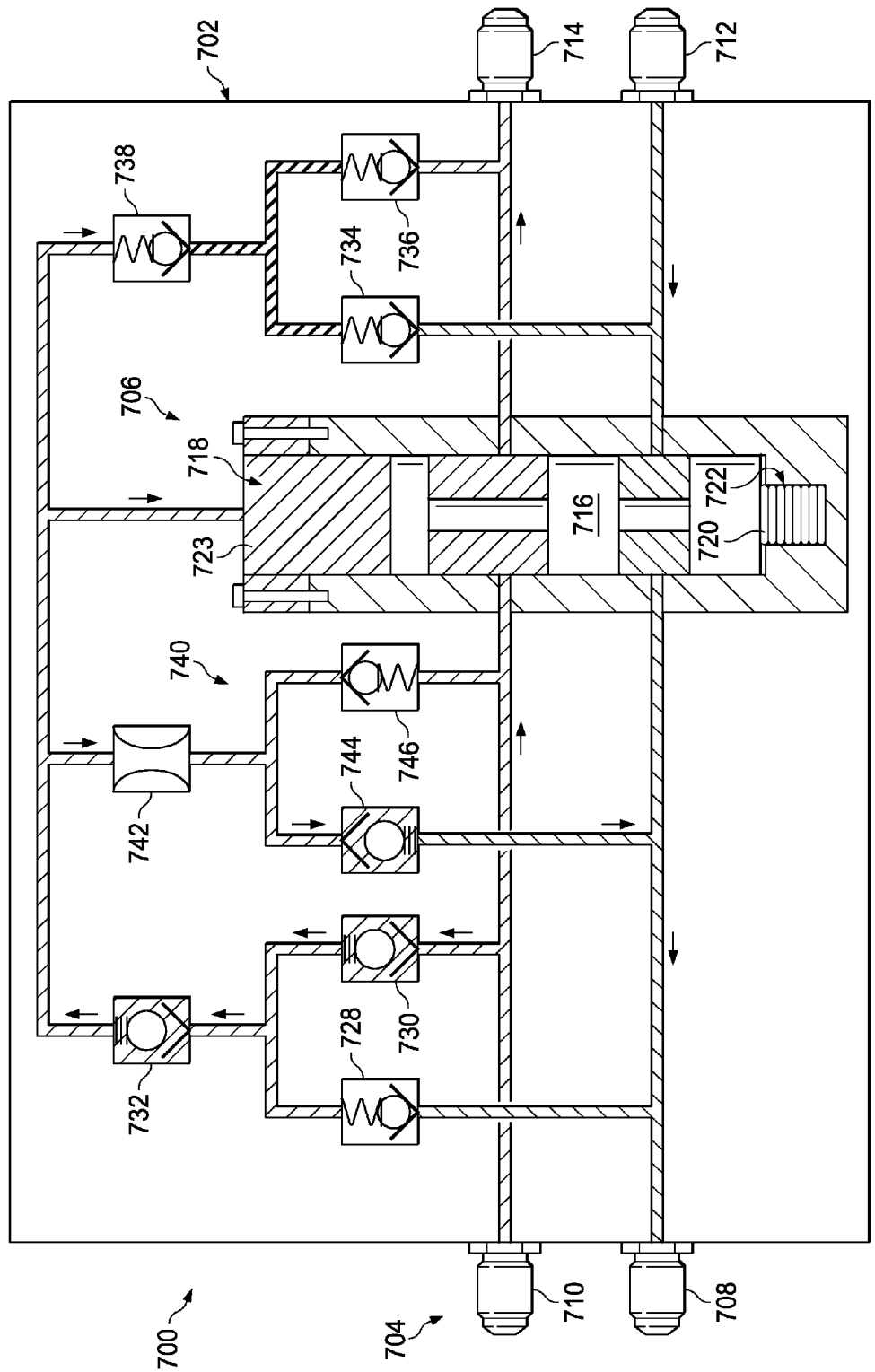
FIG. 9 is an illustration of a valve system in an open state in accordance with an advantageous embodiment.

With reference now to FIG. 9, an illustration of valve system 706 in an open state is depicted in accordance with an advantageous embodiment. In this illustrative example, valve system 706 may be in an open state in response to the tanker aircraft having valve 700 retracting the refueling boom (not shown).

As depicted, fluid may flow from second port 710, through check valve 730, through check valve 732, and into portion 723 of cavity 718. The fluid in portion 723 of cavity 718 may cause flow valve 734 to move downwards into the open state. Fluid may be allowed to flow from second port 710 to fourth port 714. Fluid may also be allowed to flow from third port 712 to first port 708.

Further, fluid may flow through return system 740. As depicted, fluid may flow through flow restrictor 742, through check valve 744, and into first port 708.

Figure 10:
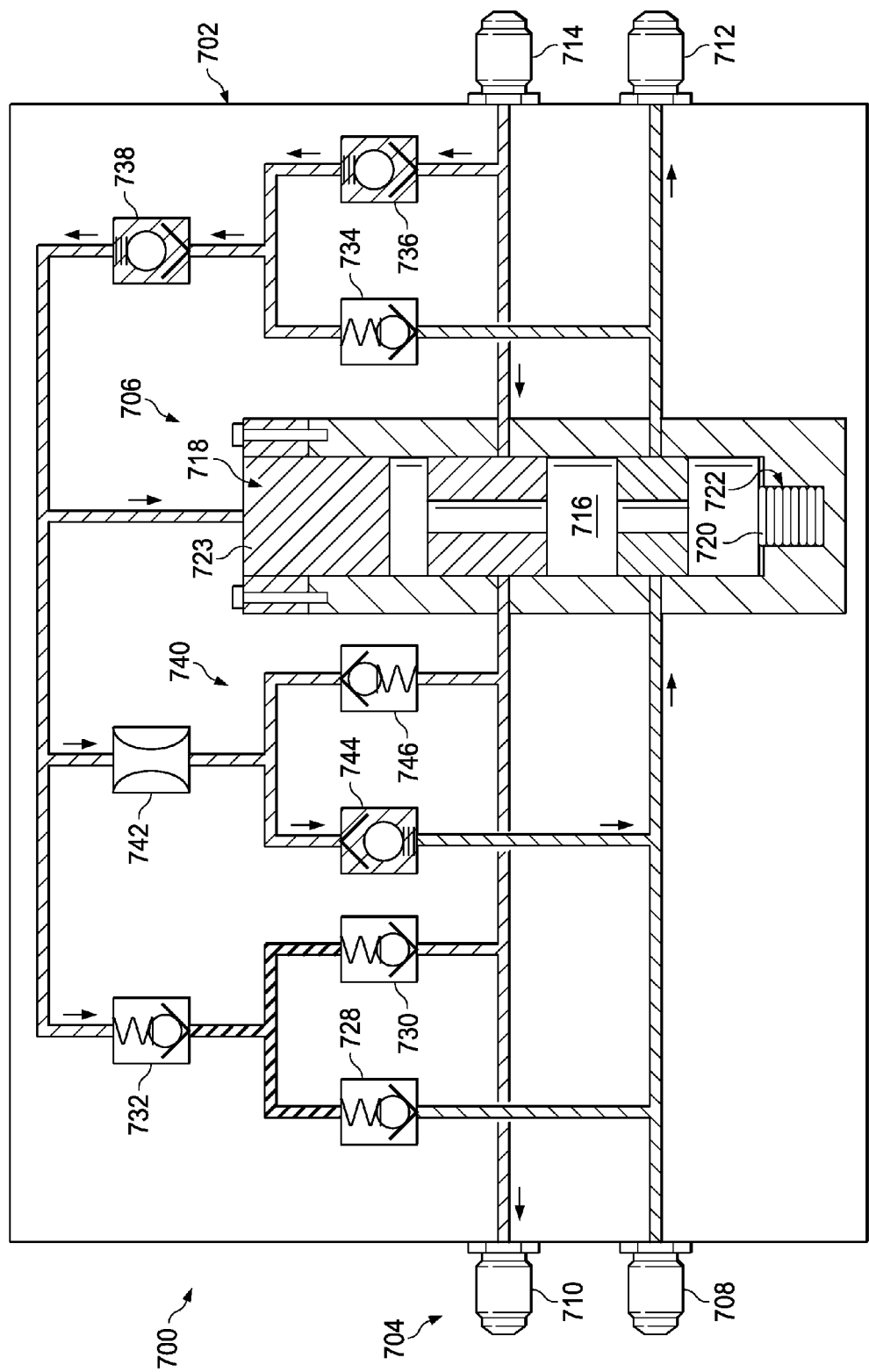
FIG. 10 is an illustration of a valve system in an open state in accordance with an advantageous embodiment.

With reference now to FIG. 10, an illustration of valve system 706 in an open state is depicted in accordance with an advantageous embodiment. In this illustrative example, valve system 706 may be in an open state in response to the receiver aircraft pulling on the refueling boom (not shown).

As depicted, fluid may not be allowed to flow from either first port 708 or second port 710 into portion 723 of cavity 718. However, fluid may be allowed to pass from fourth port 714, through check valve 734, through check valve 738, and into portion 723 of cavity 718. Fluid in portion 723 of cavity 718 may move flow valve 716 into the open state. Fluid may be allowed to pass from first port 708 to third port 712 and from fourth port 714 to second port 710.

Further, fluid may flow through return system 740. Fluid may flow through flow restrictor 742, through check valve 744, and into first port 708.

Figure 11:
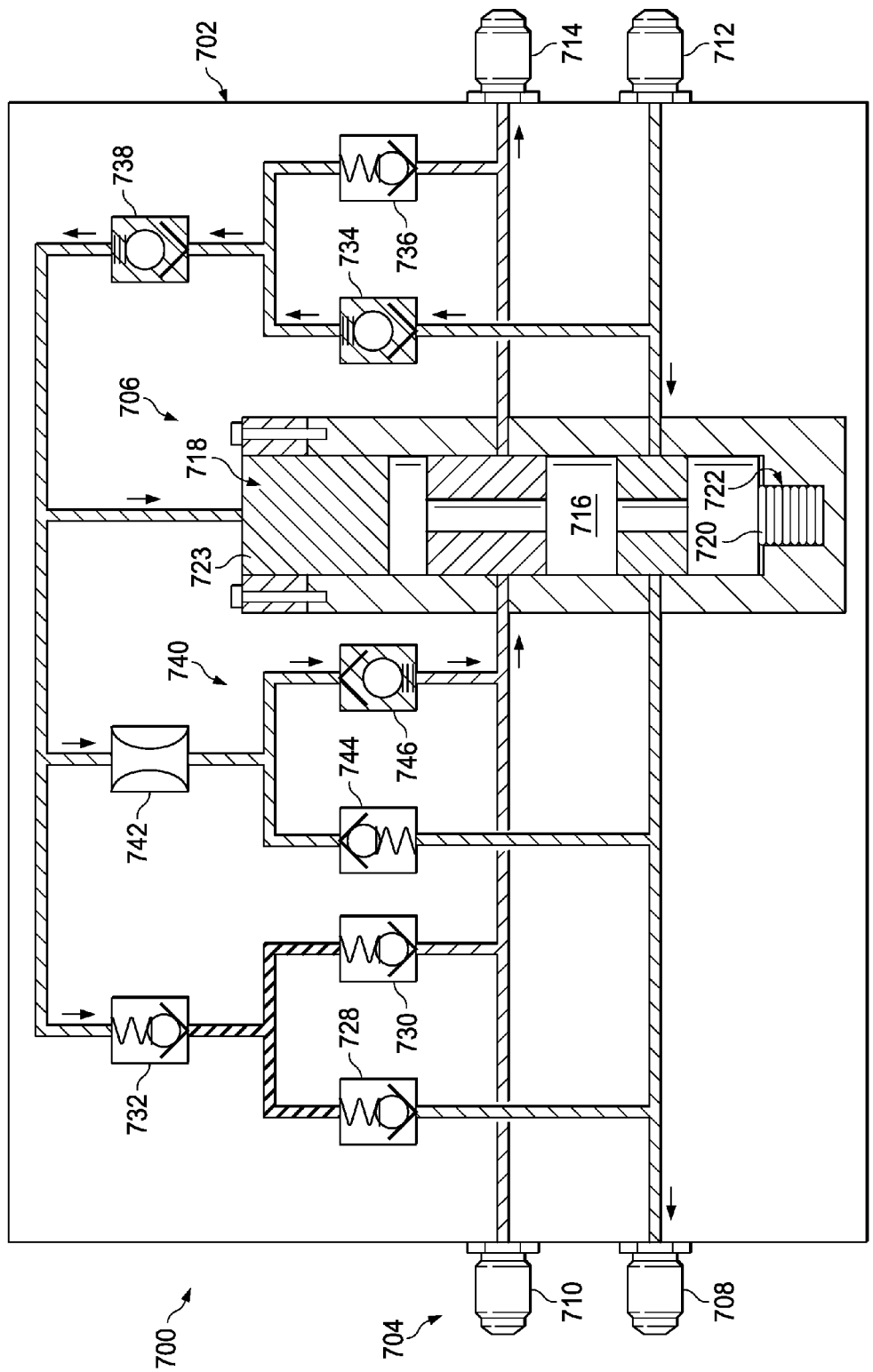
FIG. 11 is an illustration of a valve system in an open state in accordance with an advantageous embodiment.

With reference now to FIG. 11, an illustration of valve system 706 in an open state is depicted in accordance with an advantageous embodiment. In this illustrative example, valve system 706 may be in an open state in response to the receiver aircraft pushing on the refueling boom (not shown).

As depicted, fluid may not be allowed to flow from either first port 708 or second port 710 into portion 723 of cavity 718. However, fluid may be allowed to pass from third port 712, through check valve 734, through check valve 738, and into portion 723 of cavity 718. Fluid in portion 723 of cavity 718 may move flow valve 716 into the open state. Fluid may be allowed to pass from third port 712 to first port 708 and from second port 710 to fourth port 714.

Further, fluid may flow through return system 740. Fluid may flow through flow restrictor 742, through check valve 746, and into second port 710.

The illustrations of valve 700 in FIGS. 7-11 are not meant to imply physical or architectural limitations to the manner in which different valves may be implemented. For example, other components in addition to or in place of the ones illustrated may be used. Also, in some advantageous embodiments, fewer components than those illustrated for valve 700 in FIGS. 7-11 may be used.

With reference now to FIGS. 12-16, illustrations of different views of a configuration for a valve are depicted in accordance with an advantageous embodiment. In these illustrative examples, valve 400 in FIG. 4 may be depicted from different side views and cross-sectional views.

Turning now to FIG. 12, an illustration of a side view of valve 400 is depicted in accordance with an advantageous embodiment. In this illustrative example, valve 400 may be shown from side 409 of housing 402. As depicted, third port 410 and fourth port 412 may be seen on side 409 of housing 402.

Turning now to FIG. 13, an illustration of a side view of valve 400 is depicted in accordance with an advantageous embodiment. In this illustrative example, valve 400 may be shown from side 407 of housing 402. As depicted, first port 406 and second port 408 may be seen on side 407 of housing 402.

Figure 14:
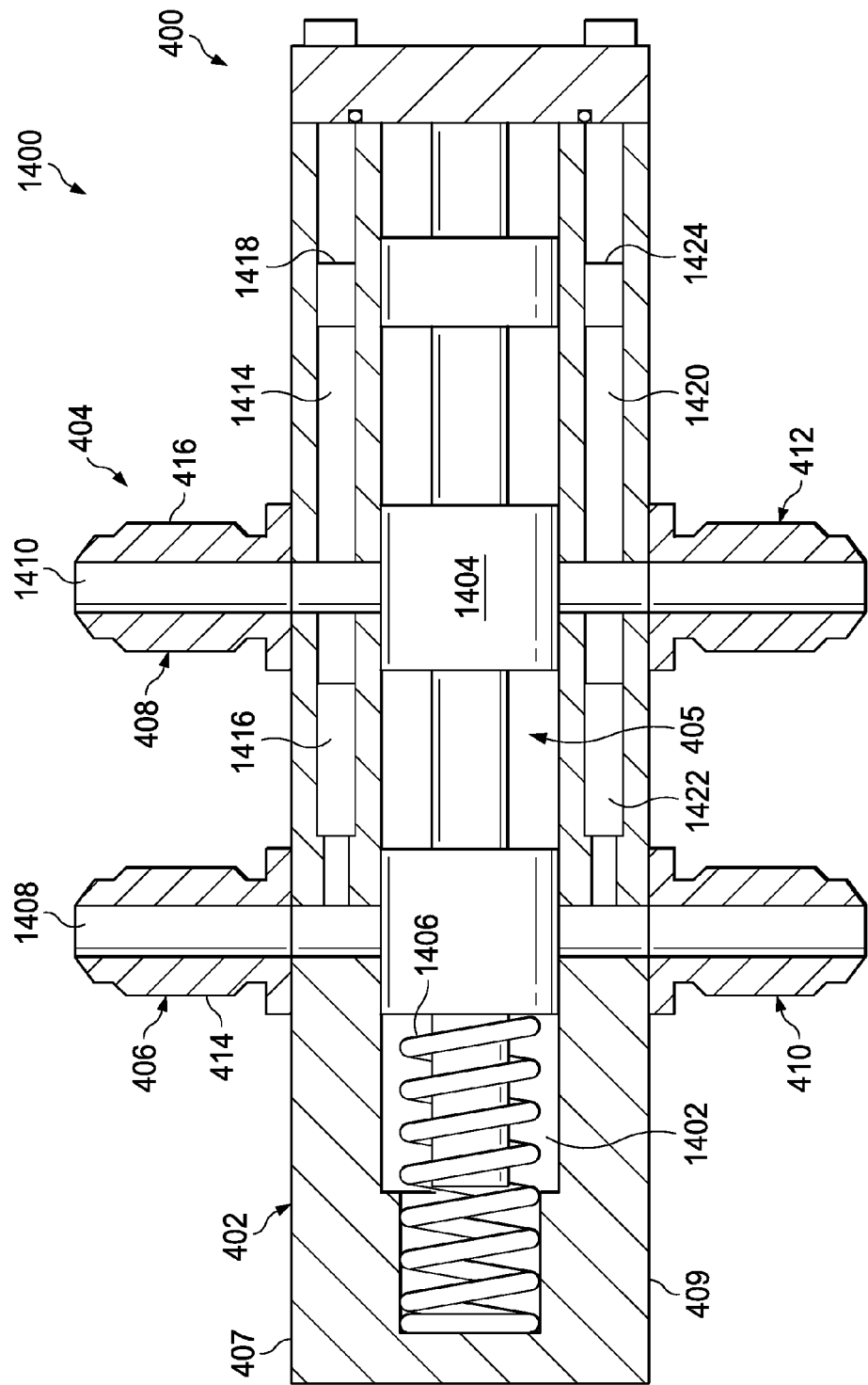
FIG. 14 is an illustration of a cross-sectional view of a valve in accordance with an advantageous embodiment.

Turning now to FIG. 14, an illustration of a cross-sectional view of valve 400 is depicted in accordance with an advantageous embodiment. In this illustrative example, cross-section 1400 of valve 400 may be taken along lines 14-14 in FIG. 12.

As depicted, cavity 1402 may be located within housing 402. Valve system 405 may be located within cavity 1402. Valve system 405 may comprise flow valve 1404. Further, flow valve 1404 may be biased by spring 1406 to block plurality of ports 404. When blocking plurality of ports 404, flow valve 1404 and valve system 405 may be in a closed state.

For example, without limitation, flow valve 1404 may block channel 1408 between first port 406 and third port 410 in the closed state. In other words, fluid may not be allowed to flow between first port 406 and third port 410 in channel 1408. Further, flow valve 1404 may block channel 1410 between second port 408 and fourth port 412 in the closed state. Fluid may not be allowed to flow in channel 1410 between second port 408 and fourth port 412.

In this illustrative example, channel 1414 may be drilled into housing 402. Channel 1414 may connect first port 406 and second port 408. Further, shuttle valve 1416 may be located in channel 1414. Plug 1418 may be positioned in channel 1414 to prevent fluid in channel 1414 from flowing out of housing 402.

Further, channel 1420 may be drilled into housing 402. Channel 1420 may connect third port 410 and fourth port 412. Shuttle valve 1422 may be located in channel 1420. Plug 1424 may be positioned in channel 1420 to prevent fluid in channel 1420 from flowing out of housing 402.

Figure 15:
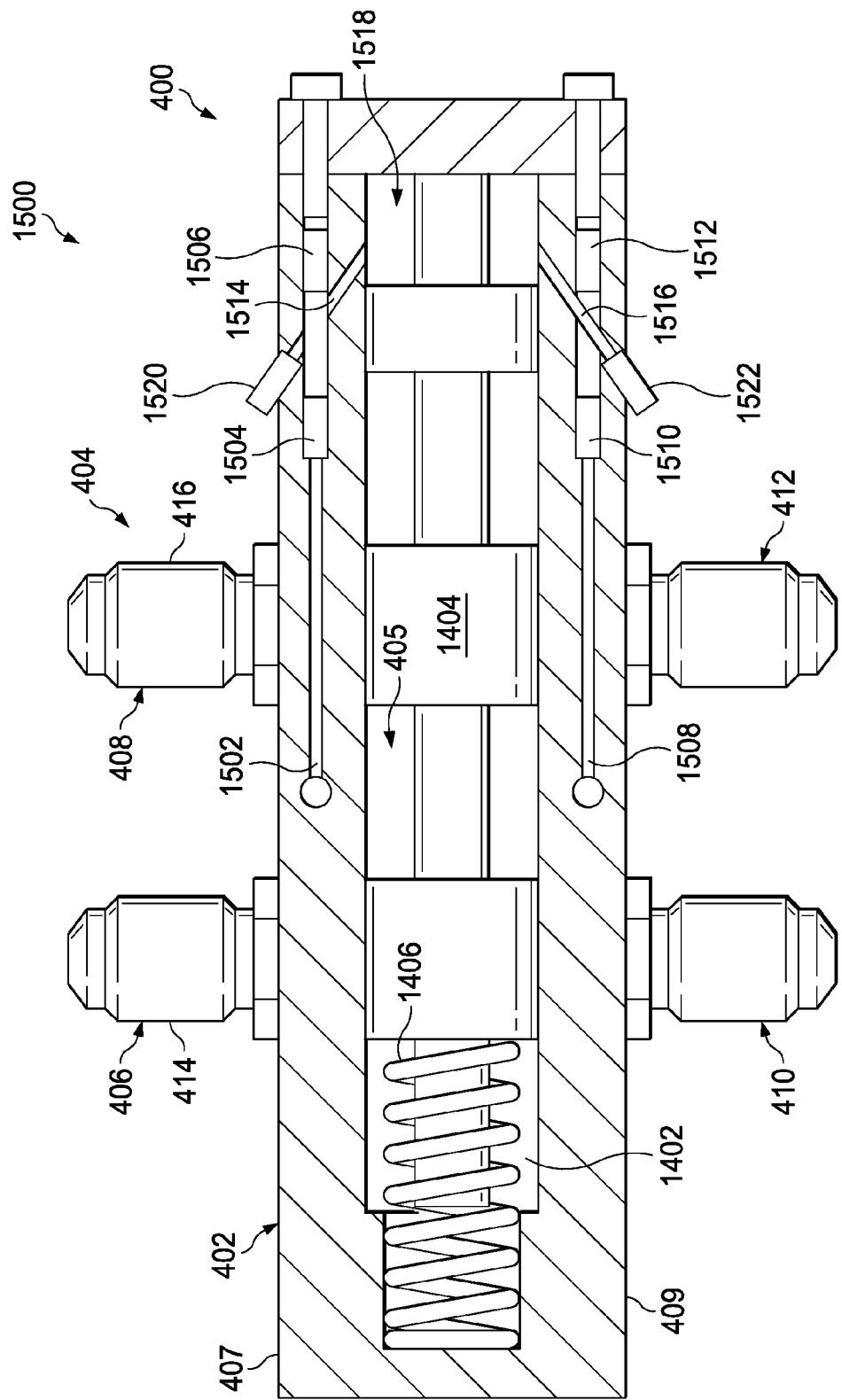
FIG. 15 is an illustration of a cross-sectional view of a valve in accordance with an advantageous embodiment.

With reference now to FIG. 15, an illustration of a cross-sectional view of valve 400 is depicted in accordance with an advantageous embodiment. In this illustrative example, cross-section 1500 of valve 400 may be taken along lines 15-15 in FIG. 12.

As depicted, channel 1502 may be drilled into housing 402. Channel 1502 may connect to shuttle valve 1416 in FIG. 14. For example, without limitation, fluid flowing from either first port 406 or second port 408 and through shuttle valve 1416 in FIG. 14 may pass through channel 1502 and check valve 1504 in channel 1502. Plug 1506 may be positioned in channel 1502 to prevent fluid flowing in channel 1502 from flowing out of housing 402.

In a similar manner, channel 1508 may be drilled into housing 402. Channel 1508 may connect to shuttle valve 1422 in FIG. 14. Fluid flowing from either third port 410 or fourth port 412 and through shuttle valve 1422 in FIG. 14 may pass through channel 1508 and check valve 1510 in channel 1508. Plug 1512 may be positioned in channel 1508 to prevent fluid flowing in channel 1508 from flowing out of housing 402.

In this illustrative example, channel 1514 and channel 1516 may also be drilled into housing 402. Channel 1514 may allow fluid in channel 1502 to flow into portion 1518 of cavity 1402. Channel 1516 may allow fluid in channel 1508 to flow into portion 1518 of cavity 1402. Plug 1520 and plug 1522 may be placed in channel 1514 and channel 1516, respectively, to prevent fluid in channel 1514 and channel 1516, respectively, from flowing out of housing 402.

Figure 16:
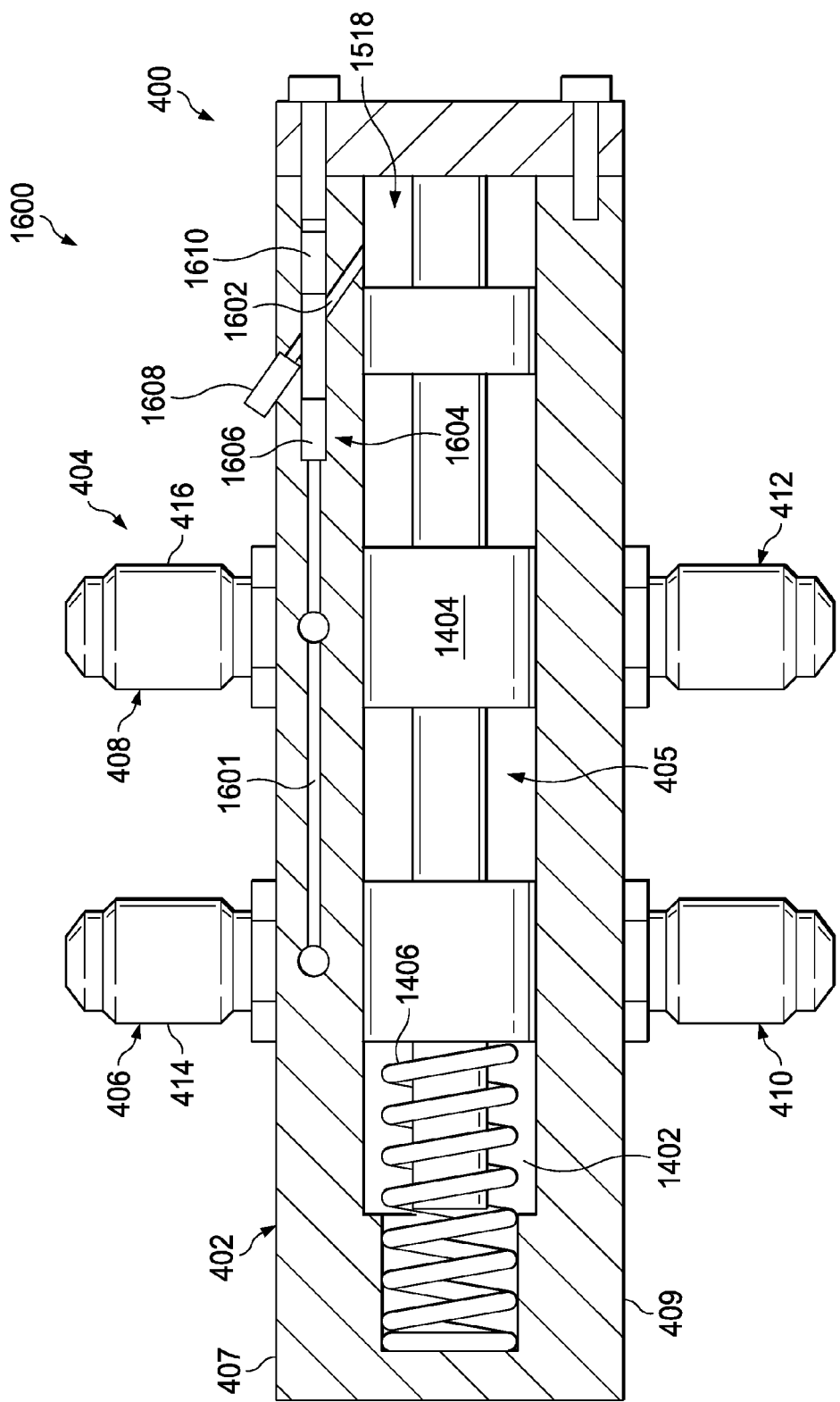
FIG. 16 is an illustration of a cross-sectional view of a valve in accordance with an advantageous embodiment.

Turning now to FIG. 16, an illustration of a cross-sectional view of valve 400 is depicted in accordance with an advantageous embodiment. In this illustrative example, cross section 1600 of valve 400 may be taken along lines 16-16 in FIG. 12.

As depicted, channel 1601 may be drilled into housing 402. Channel 1601 may connect to first port 406 and second port 408. Channel 1602 may also be drilled into housing 402. Channel 1602 may allow fluid in portion 1518 of cavity 1402 to flow into channel 1601.

Channel 1601 and channel 1602 may be part of return system 1604 for valve system 405. In this illustrative example, fluid may flow through flow restrictor 1606 in channel 1601.

Plug 1608 may be positioned in channel 1602 to prevent fluid in channel 1602 from flowing out of housing 402. Plug 1610 may be positioned in channel 1601 to prevent fluid in channel 1601 from flowing out of housing 402.

Figure 17:
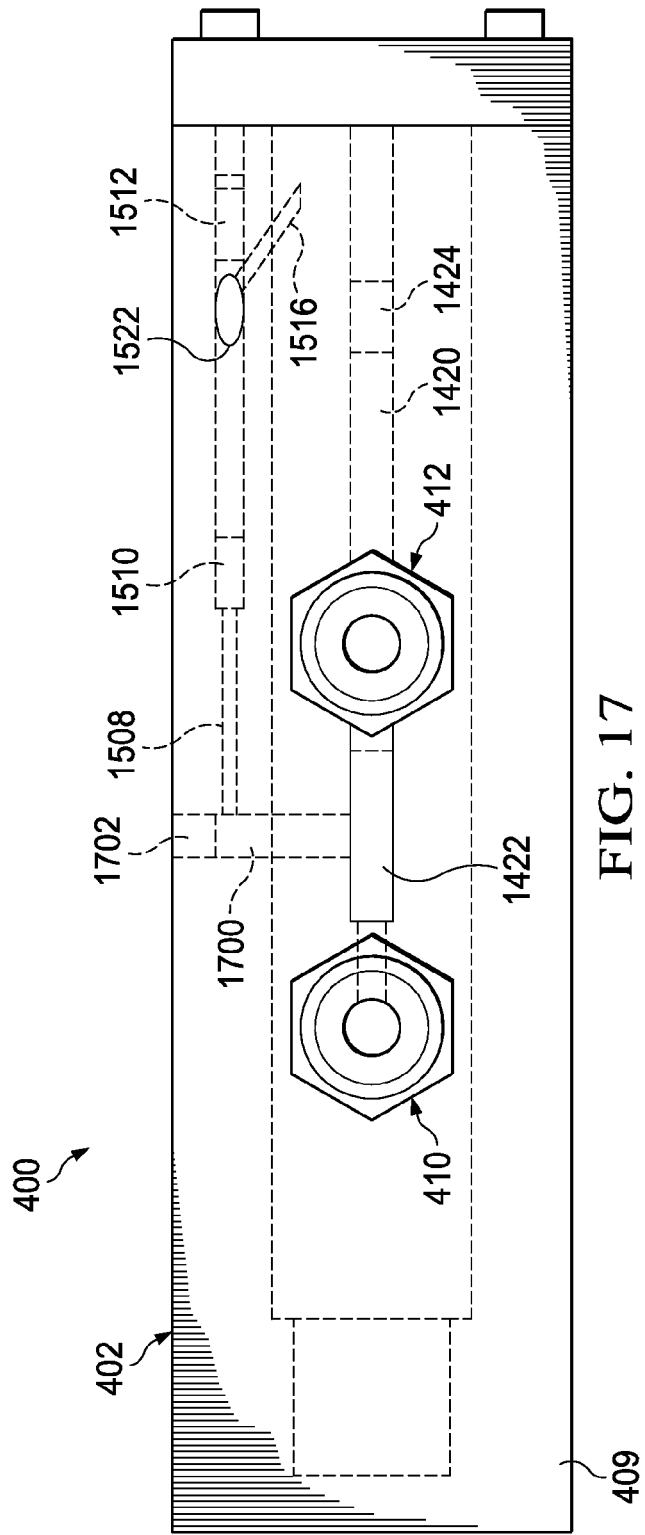
FIG. 17 is an illustration of an exposed side view of a valve in accordance with an advantageous embodiment.

Turning now to FIG. 17, an illustration of an exposed side view of valve 400 is depicted in accordance with an advantageous embodiment. In this illustrative example, an exposed view of valve 400 may be shown from side 409 of housing 402.

Channel 1700 may be drilled into housing 402 to connect channel 1508 to shuttle valve 1422. Plug 1702 may be positioned in channel 1700 to prevent fluid from flowing out of housing 402.

Figure 18:
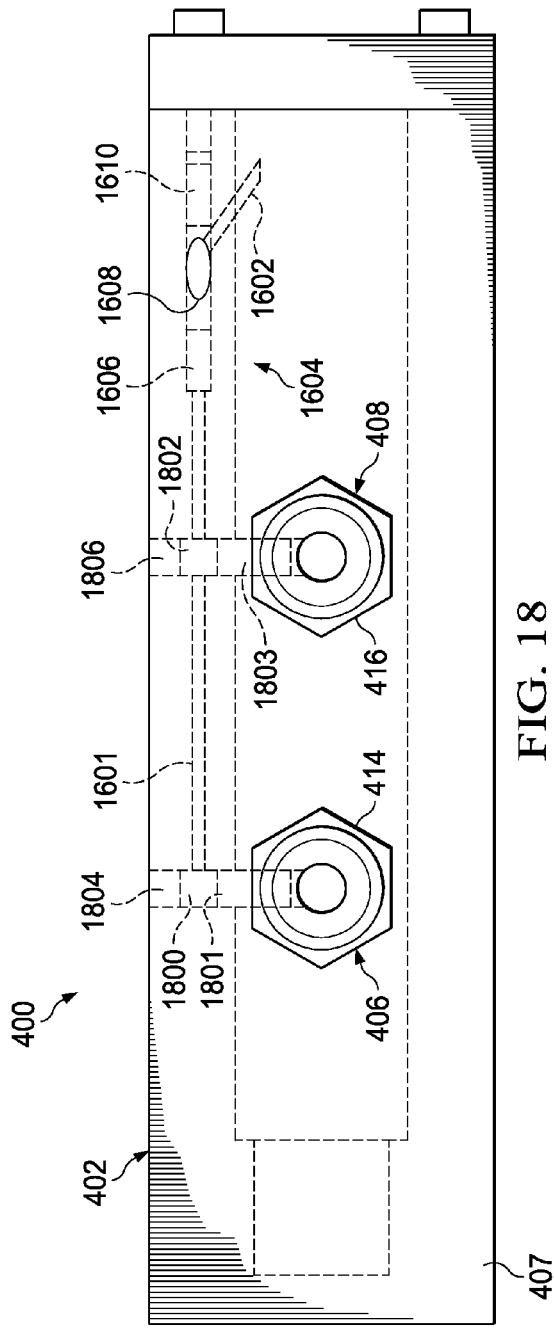
FIG. 18 is an illustration of an exposed side view of a valve in accordance with an advantageous embodiment.

Turning now to FIG. 18, an illustration of an exposed side view of valve 400 is depicted in accordance with an advantageous embodiment. In this illustrative example, an exposed view of valve 400 may be shown from side 407 of housing 402.

Channel 1800 and channel 1802 may be drilled into housing 402. Check valve 1801 and check valve 1803 may be located in channel 1800 and channel 1802, respectively. In this illustrative example, fluid flowing through return system 1604 in channel 1601 may pass through check valve 1801 and check valve 1803. The fluid may pass through check valve 1801 to reach first port 406 and through check valve 1803 to reach second port 408.

As depicted, plug 1804 and plug 1806 may be positioned in channel 1800 and channel 1802, respectively, to prevent fluid from flowing outside of housing 402.

The illustrations of valve 400 in FIG. 4 and valve 400 in FIGS. 12-18 are not meant to imply physical or architectural limitations to the manner in which different valves may be implemented. For example, without limitation, other components in addition to or in place of the ones illustrated may be used. Also, in some advantageous embodiments, fewer components than those illustrated for valve 400 in FIG. 4 and valve 400 in FIGS. 12-18 may be used.

Figure 19:
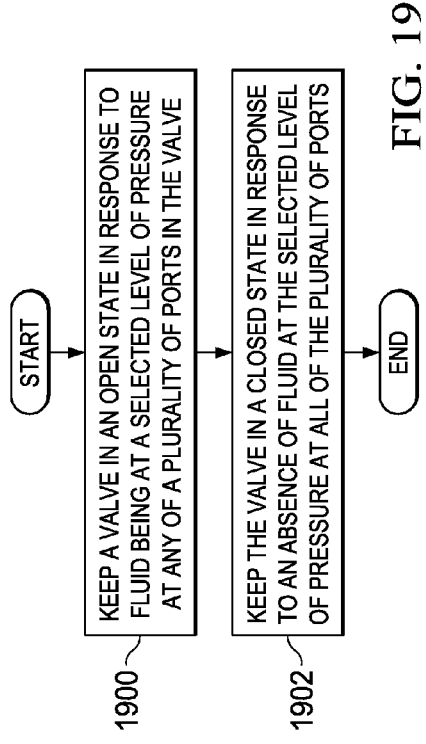
FIG. 19 is an illustration of a flowchart of a process for controlling fluid flow in accordance with an advantageous embodiment.

With reference now to FIG. 19, an illustration of a flowchart of a process for controlling fluid flow is depicted in accordance with an advantageous embodiment. The process illustrated in FIG. 19 may be implemented using valve 352 in refueling system 306 in refueling environment 300 in FIG. 3.

The process may begin by keeping valve 352 in open state 368 in response to fluid 376 being at selected level of pressure 367 at any of plurality of ports 356 in valve 352 (operation 1900). Valve 352 may comprise housing 354, plurality of ports 356 located on housing 354, and valve system 358 located inside housing 354.

In this illustrative example, valve system 358 may be configured to be in closed state 366 when an absence of selected level of pressure 367 is present at all of plurality of ports 356. Further, valve system 358 may be configured to be in open state 368 when selected level of pressure 367 is present at any of plurality of ports 356.

The process may keep valve 352 in closed state 366 in response to an absence of fluid 376 at selected level of pressure 367 at all of plurality of ports 356 (operation 1902), with the process terminating thereafter.

The flowchart and block diagrams in the different depicted embodiments illustrate the architecture, functionality, and operation of some possible implementations of apparatus and methods in different advantageous embodiments. In this regard, each block in the flowchart or block diagrams may represent a module, segment, function, and/or a portion of an operation or step. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Also, other blocks may be added in addition to the illustrated blocks in a flowchart or block diagram.

Thus, the different advantageous embodiments provide a valve for controlling an extension of a refueling boom. In one advantageous embodiment, the valve may comprise a housing, a plurality of ports on the housing, and a valve system located inside the housing. The valve system may be configured to be in a closed state when an absence of a selected level of pressure is present at all of the plurality of ports and in an open state when the selected level of pressure is present at any of the plurality of ports.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a housing;
    a plurality of ports on the housing;
    a valve system located inside the housing in which the valve system is configured to be in a closed state when an absence of a selected level of pressure is present at all of the plurality of ports and in an open state when the selected level of pressure is present at any of the plurality of ports, wherein the housing, the plurality of ports, and the valve system comprises a number of flow valves biased to block the plurality of ports when the selected level of pressure is absent at the all of the plurality of ports, and wherein the valve system further comprises a number of one way valves in which each of the number of one way valves is associated with a port in the plurality of ports and a cavity in the housing, wherein the each of the number of one way valves is configured to pass a fluid from a corresponding port into the cavity to generate a pressure, in which the pressure moves the number of flow valves into the open state when the selected level of pressure is present at the any of the plurality of ports;
    a controller; and
    a motor configured to move a boom between a retracted position and an extended position, wherein the valve is connected to the controller and the motor.

2. The apparatus of claim 1, wherein the plurality of ports comprises:
    a first port;
    a second port;
    a third port; and
    a fourth port.

3. The apparatus of claim 2, wherein the first port and the second port are connected to each other by a number of relief valves.

4. The apparatus of claim 2, wherein the first port and the second port are connected to a controller and the third port and the fourth port are connected to a hydraulic motor, wherein the controller controls the hydraulic motor to control movement of a telescoping boom.

5. The apparatus of claim 1, wherein the number of one way valves comprises at least one of a number of check valves and a number of shuttle valves.

6. The apparatus of claim 1, wherein the valve system further comprises a return system configured to allow the fluid to flow from the cavity into a number of ports in the plurality of ports.

7. The apparatus of claim 6, wherein the return system comprises:
    a flow restrictor; and
    a second number of one way valves.

8. A hydraulic control system for a hydraulic motor configured to move a telescoping boom in an aircraft, the hydraulic control system comprising:
    a housing;
    a plurality of ports on the housing, in which the plurality of ports comprises a first port, a second port, a third port, and a fourth port in which the first port and the second port are connected to a controller and the third port and the fourth port are connected to the hydraulic motor, wherein the controller controls the hydraulic motor to control movement of the telescoping boom;
    a number of one way valves in which each of the number of one way valves is associated with a port in the plurality of ports and a cavity in the housing, in which the each of the number of one way valves is configured to pass a fluid from a corresponding port into the cavity to generate a pressure, and in which the number of one way valves comprises at least one of a number of check valves and a number of shuttle valves; and
    a valve system located inside the housing in which the housing, the plurality of ports, the number of one way valves, and the valve system form a valve, and in which the valve system is configured to be in a closed state when an absence of a selected level of pressure is present at all of the plurality of ports and in an open state when the selected level of pressure is present at any of the plurality of ports in which the valve system comprises a number of flow valves biased to block the plurality of ports when the selected level of pressure is absent at the all of the plurality of ports, in which the pressure generated by passing the fluid into the cavity moves the number of flow valves into the open state when the selected level of pressure is present at the any of the plurality of ports; and a return system configured to allow the fluid to flow from the cavity into a number of ports in the plurality of ports in which the return system comprises a flow restrictor and a second number of one way valves.

9. The hydraulic control system of claim 8, wherein the first port and the second port are connected to each other by a number of relief valves.

10. A method for controlling fluid flow, the method comprising:
    responsive to a fluid being at a selected level of pressure at any of a plurality of ports in at least one valve, keeping a valve system in an open state in which the valve system is for the at least one valve comprising a housing; the plurality of ports on the housing; and the valve system located inside the housing in which the valve system is configured to be in a closed state when an absence of the selected level of pressure is present at all of the plurality of ports and in the open state when the selected level of pressure is present at the any of the plurality of ports;
    responsive to an absence of the fluid being at the selected level of pressure at the all of the plurality of ports, keeping the valve system in the closed state; and
    passing the fluid from a port in the plurality of ports through a number of one way valves into a cavity in the housing to generate a pressure, wherein the pressure moves the valve system into the open state when the selected level of pressure is present at the port in the plurality of ports.

11. The method of claim 10 further comprising:

responsive to the valve system being in the closed state and the fluid being at the selected level of pressure at the any of the plurality of ports in the valve, changing the valve system from the closed state to the open state.

12. The method of claim 10 further comprising:

responsive to the valve system being in the open state and the absence of the fluid being at the selected level of pressure at the any of the plurality of ports in the valve, changing the valve system from the open state to the closed state.

13. The method of claim 10, wherein the valve system comprises a number of flow valves and wherein the step of keeping the valve system in the closed state comprises:

responsive to the absence of the fluid being at the selected level of pressure at the all of the plurality of ports, biasing the number of flow valves to block the plurality of ports to keep the valve system in the closed state when the selected level of pressure is absent at the all of the plurality of ports.

14. The method of claim 10, wherein the plurality of ports comprises a first port, a second port, a third port, and a fourth port in which the first port and the second port are connected to a controller for controlling a refueling boom and the third port and the fourth port are connected to a hydraulic motor.

15. The method of claim 10 further comprising:

passing the fluid through a port in the plurality of ports to a hydraulic motor to cause the hydraulic motor to perform one of extending a refueling boom and retracting the refueling boom for a tanker aircraft.

16. The method of claim 10 further comprising:

allowing the fluid to flow from the cavity into a number of ports in the plurality of ports.

17. A method for controlling fluid flow for a hydraulic motor in a refueling system for an aircraft, the method comprising:

responsive to a fluid being at a selected level of pressure at any of a plurality of ports in at least one valve, keeping a valve system in an open state in which the valve system is for the at least one valve comprising a housing; the plurality of ports on the housing in which the plurality of ports comprises a first port, a second port, a third port, and a fourth port in which the first port and the second port are connected to a controller for controlling a refueling boom in the refueling system and the third port and the fourth port are connected to the hydraulic motor; and the valve system located inside the housing in which the valve system is configured to be in a closed state when an absence of the selected level of pressure is present at all of the plurality of ports and in the open state when the selected level of pressure is present at any of the plurality of ports, in which the valve system comprises a number of flow valves;

responsive to an absence of the fluid being at the selected level of pressure at the all of the plurality of ports, biasing the number of flow valves to block the plurality of ports when the selected level of pressure is absent at the all of the plurality of ports to keep the valve system in the closed state;

responsive to the valve system being in the closed state and the fluid being at the selected level of pressure at the any of the plurality of ports in the valve, changing the valve system from the closed state to the open state;

responsive to the valve system being in the open state and the absence of the fluid being at the selected level of pressure at the any of the plurality of ports in the valve, changing the valve system from the open state to the closed state;

responsive to the valve system being in the open state, passing the fluid through a port in the plurality of ports to the hydraulic motor to cause the hydraulic motor to perform one of extending the refueling boom and retracting the refueling boom; and allowing the fluid to flow from a cavity in the housing into a number of ports in the plurality of ports.

\* \* \* \* \*